(12) United States Patent
Fujiwara et al.

(10) Patent No.: US 9,751,499 B2
(45) Date of Patent: Sep. 5, 2017

(54) WIPER BLADE

(75) Inventors: Masaru Fujiwara, Kiryu (JP);
Hiroyuki Sase, Tochigi (JP); Kouji Okabe, Wako (JP); Hisaaki Naruse, Wako (JP); Hiroyuki Ikeno, Wako (JP); Akira Takayama, Wako (JP); Naomi Sase, legal representative, Tochigi (JP)

(73) Assignees: MITSUBA CORPORATION, Gunma (JP); HONDA MOTOR CO., LTD., Tokyo (JP)

( * ) Notice: Subject to any disclaimer, the term of this patent is extended or adjusted under 35 U.S.C. 154(b) by 850 days.

(21) Appl. No.: 13/997,329

(22) PCT Filed: Nov. 29, 2011

(86) PCT No.: PCT/JP2011/077572
§ 371 (c)(1),
(2), (4) Date: Jun. 23, 2014

(87) PCT Pub. No.: WO2012/090635
PCT Pub. Date: Jul. 5, 2012

(65) Prior Publication Data
US 2014/0352099 A1      Dec. 4, 2014

(30) Foreign Application Priority Data

Dec. 27, 2010  (JP) ................................. 2010-289896
Dec. 27, 2010  (JP) ................................. 2010-289897

(51) Int. Cl.
*B60S 1/38* (2006.01)
*B60S 1/40* (2006.01)
*B60S 1/34* (2006.01)

(52) U.S. Cl.
CPC ............ *B60S 1/3445* (2013.01); *B60S 1/381* (2013.01); *B60S 1/3858* (2013.01);
(Continued)

(58) Field of Classification Search
CPC .......... B60S 1/38; B60S 1/381; B60S 1/3881; B60S 1/3874; B60S 1/3808; B60S 1/3848
(Continued)

(56) References Cited

U.S. PATENT DOCUMENTS

2003/0159229 A1   8/2003  Weiler et al.
2009/0089956 A1*  4/2009  De Block ............. B60S 1/3881
                                                   15/250.201
(Continued)

FOREIGN PATENT DOCUMENTS

DE   102008040033 A1   12/2009
DE   102009014313 A1    9/2010
(Continued)

OTHER PUBLICATIONS

International Search Report for Serial No. PCT/JP2011/077572 dated Feb. 6, 2012.
(Continued)

*Primary Examiner* — Gary Graham
(74) *Attorney, Agent, or Firm* — McCormick, Paulding & Huber LLP

(57) ABSTRACT

Provided is a wiper blade wherein: a pair of accommodation sections (31*d*) are disposed so as to sandwich therebetween a holding section (31*a*) that holds a main body section (21); a vertebra (31*e*) is accommodated in each of the accommodation sections (31*d*); an arm connection member (40) to which a wiper arm is connected is fixed to each vertebra (31*e*); a rubber pressing section (31*f*) that presses the main body section (21) towards a front glass is disposed in a section of the holding section (31*a*) that faces the front glass; and a holder pressing section (31*g*) that presses a holder member (30) towards the front glass by the elastic force of each vertebra (31*e*) is disposed in the section of each accommodation section (31*d*) that faces the front glass,
(Continued)

further on the front glass side than the rubber pressing section (31f).

9 Claims, 16 Drawing Sheets

(52) U.S. Cl.
CPC ........... *B60S 1/3881* (2013.01); *B60S 1/3889* (2013.01); *B60S 1/3894* (2013.01); *B60S 1/4019* (2013.01); *B60S 2001/4022* (2013.01)

(58) Field of Classification Search
USPC ...................................... 15/250.201, 250.43
See application file for complete search history.

(56) References Cited

U.S. PATENT DOCUMENTS

2010/0170055 A1   7/2010   Boland

2010/0218332 A1*  9/2010   Stankiewicz ........... B60S 1/381
                                                        15/250.201
2011/0302738 A1   12/2011  Egner-Walter et al.

FOREIGN PATENT DOCUMENTS

| EP | 1574410 A1 | | 9/2005 |
|---|---|---|---|
| FR | 2928887 A1 | | 9/2009 |
| GB | 2458722 A | * | 9/2009 |
| JP | 2007-91088 A | | 4/2007 |
| JP | 2007-532380 A | | 11/2007 |
| JP | 2010-531265 A | | 9/2010 |
| WO | 2004/054860 A1 | | 1/2004 |
| WO | 2005-108177 A1 | | 11/2005 |
| WO | 2009/153097 A1 | | 12/2009 |

OTHER PUBLICATIONS

European Search Report for European Application No. EP11853225 dated Jun. 23, 2015.

* cited by examiner

WIPER BLADE

CROSS-REFERENCE TO RELATED APPLICATION

This application is entitled to the benefit of and incorporates by reference subject matter in its entirety disclosed in International Patent Application No. PCT/JP2011/077572 filed on Nov. 29, 2011 and Japanese Patent Applications No. 2010-289896 filed on Dec. 27, 2010 and No. 2010-289897 filed on Dec. 27, 2010.

TECHNICAL FIELD OF THE INVENTION

The present invention relates to a wiper blade attached to a wiper arm swingably provided on a vehicle and operating reciprocating wiping on a windshield.

BACKGROUND OF THE INVENTION

Conventionally, a vehicle such as an automobile is equipped with a wiper device, which wipes off rainwater, dust, etc. attached on a windshield to ensure the view of a driver. The wiper device is provided with a wiper arm swingably driven by an electric motor, and a wiper blade attached to the wiper arm. The wiper blade is provided with a holder main body rotatably attached to a distal-end side of the wiper arm, and a blade rubber retained by the holder main body. The blade rubber is elastically contacted toward the windshield by the pressing force of the wiper arm and the elastic force of vertebrae, thereby swingably drives the wiper arm by driving an electric motor; as a result, the blade rubber operates reciprocating wiping on the windshield.

As such a wiper blade, for example, the techniques described in WO 2009/153097 has been known. The wiper blade described in WO 2009/153097 is provided with a holder main body (14) retaining a blade rubber (38) with a pair of vertebrae (36). An arm coupling member (50) is connected to the holder main body (14) via a pair of supporting members (22). Therefore, the pressing force of a wiper arm is transmitted to the blade rubber (38) via the arm coupling member (50), the supporting members (22), and the holder main body (14).

The wiping performance of a wiper blade has been improved by integrally providing a fin part receiving travel winds along the longitudinal direction of a wiper blade, thereby imparting downforce (pressing force toward the windshield) to the wiper blade. As a wiper blade having such a fin part, for example, the techniques described in Japanese Patent Publication No. 2007-532380 (FIG. 1) has been known. The wiper blade described in Japanese Patent Publication No. 2007-532380 (FIG. 1) is provided with a blade rubber (bottom-part wiping strip), a flat-plate-like vertebra (longitudinal-direction center element), and a fin part (spoiler) from the windshield (window) side, in order, that is, a triple structure. The vertebra is provided inside a holder main body (center tubular main body), and the fin part is integrally formed with the holder main body.

However, according to the wiper blade described in WO 2009/153097, the height at which the pressing force of the wiper arm acts is higher than the height at which the elastic force of the vertebrae (36) acts, that is, the distance from the windshield to each supporting member (22) is longer than the distance from the windshield to each vertebra (36). Therefore, the pressing force of the wiper arm and the elastic force of the vertebrae (36) are transmitted from different heights to the blade rubber (38), the transmitting directions of the pressing force and the elastic force are varied when the wiper blade carries out reciprocating wiping operation, therefore, and wiping does not uniform without getting stabilization of the wiping performance of the wiper blade.

SUMMARY OF THE INVENTION

The object of the present invention is to provide a wiper blade enabling wiping performance to improve by stably transferring the pressing force of the wiper arm and the elastic force of the vertebrae.

A wiper blade of the present invention is attached to a wiper arm swingably provided on a vehicle and operating reciprocating wiping on a windshield, comprises: a blade rubber comprising a lip part contacted with the windshield and a main-body part integrally formed with the lip part; a holder main body comprising a retaining part retaining the main-body part; a pair of housing parts provided in short-side-direction both sides of the holder main body so as to sandwich the retaining part; a pair of vertebrae housed in each of the housing parts and elastically deforming the blade rubber in accordance with a curvature factor of the windshield; an arm coupling member fixed to each of the vertebrae and coupled to the wiper arm; a rubber pressing part provided in an opposed part to the windshield of the retaining part, and pressing the main-body part against the windshield; and a holder pressing part that is provided in an opposed part to the windshield of each of the housing parts, and in a side closer to the windshield than the rubber pressing part and pressing the holder main body toward the windshield by elastic force of the vertebra.

The wiper blade of the present invention is wherein each of the vertebrae is movably housed in the housing parts in the longitudinal direction thereof.

The wiper blade of the present invention is wherein a fin part is provided in an opposite side to the windshield side of the holder main body; and a vertex part farthest from the windshield of the fin part is disposed in a downstream side of a flow direction of a travel wind along a short-side direction of the holder main body.

The wiper blade of the present invention is wherein a travel-wind branching point is formed in an upstream side of the flow direction of the travel wind along the short-side direction of the holder main body; and a length from the travel-wind branching point to the vertex part is longer than a length from the travel-wind branching point to a distal end of the lip part of the blade rubber.

A wiper blade of the present invention is attached to a wiper arm swingably provided on a vehicle and operating reciprocating wiping on a windshield and comprises: a blade rubber comprising a lip part contacted with the windshield and a main-body part formed integrally with the lip part; a holder main body comprising a retaining part retaining the main-body part; a pair of housing parts provided in short-side-direction both sides of the holder main body so as to sandwich the retaining part; a pair of vertebrae housed in each of the housing parts and elastically deforming the blade rubber in accordance with a curvature factor of the windshield; an arm coupling member fixed to each of the vertebrae and coupled to the wiper arm; an upstream-side lower-end surface part provided in a short-side-direction first side of the holder main body and positioned in an upstream side of a flow direction of a travel wind and in a side of the windshield; and a downstream-side lower-end surface part provided in a short-side-direction second side of the holder main body and positioned in a downstream side of the flow direction of the travel wind and in the side of the windshield;

wherein the upstream-side lower-end surface part and the downstream-side lower-end surface part are formed so that a cross section of the holder main body along the short-side direction has an arc shape, and a curvature factor of the upstream-side lower-end surface part is larger than a curvature factor of the downstream-side lower-end surface part.

A wiper blade of the present invention is wherein the upstream-side lower-end surface part in an upstream side of a flow direction of a travel wind is provided in a short-side-direction first side of the holder main body; the downstream-side lower-end surface part in an downstream side of a flow direction of a travel wind is provided in a short-side-direction first side of the holder main body; and, the upstream-side lower-end surface part and the downstream-side lower-end surface part are formed so that a cross section of the holder main body along the short-side direction has an arc shape, and a curvature factor of the upstream-side lower-end surface part is larger than a curvature factor of the downstream-side lower-end surface part.

The wiper blade according of the present invention is wherein the holder main body is integrally provided with a fin part so as to be along a longitudinal direction of the holder main body.

The wiper blade of the present invention is wherein an upstream-side air-current surface part and a downstream-side air-current surface part are provided in a short-side-direction first side and a short-side-direction second side of the fin part, respectively; each of the air-current surface parts is formed so that a cross section thereof along the short-side direction of the fin part has an arc shape; and a curvature factor of the upstream-side air-current surface part is smaller than a curvature factor of the downstream-side air-current surface part.

The wiper blade of the present invention is wherein a connecting surface part of which cross section along the short-side direction of the fin part has an arc shape is provided between the upstream-side lower-end surface part and the upstream-side air-current surface part.

The wiper blade of the present invention is wherein the holder main body and the fin part are two-color molded with materials of which hardness is different.

According to the wiper blade of the present invention, a pair of housing parts is provided so as to sandwich a retaining part retaining a main-body part; vertebrae are housed in each of the housing parts; an arm coupling member coupling to a wiper arm is fixed to the vertebrae; a rubber pressing part pressing the main-body part toward the windshield is provided at an opposed part to the windshield of a retaining part; and, a holder pressing part pressing a holder member toward the windshield by the elastic force of each of the vertebrae is provided in an opposed part to the windshield of each of the housing part and in a side closer to the windshield than the rubber pressing part.

Therefore, the pressing force of the wiper arm and the elastic force of the vertebrae can be stably transmitted to the blade rubber from the same height, and wiping performance can be improved. Moreover, since the holder pressing part is in the side closer to the windshield than the rubber pressing part, even if the holder main body is twisted, the pressing force and the elastic force can be stably transmitted from the holder pressing part to the rubber pressing part, and the wiping performance can be further improved.

According to the wiper blade of the present invention, since each of the vertebrae is housed in the housing parts movably in the longitudinal direction thereof, the elastic force of the vertebrae can be efficiently transmitted to the holder main body and the blade rubber, and therefore the wiping performance can be further improved.

According to the wiper blade of the present invention, a fin part is provided in an opposite side to the windshield side of the holder main body, and a vertex part farthest from the windshield of the fin part is disposed in a downstream side of a flow direction of a travel wind along a short-side direction of the holder main body. Therefore, the blade rubber can be disposed in the upstream side of the flow direction of the travel wind of the fin part. Since the downforce generated when the travel wind hits the fin part can be efficiently applied to the blade rubber, the wiping performance can be further improved.

According to the wiper blade of the present invention, a travel-wind branching point is formed in an upstream side of the flow direction of the travel wind along the short-side direction of the holder main body; and a length from the travel-wind branching point to the vertex part is longer than a length from the travel-wind branching point to a distal end of the lip part of the blade rubber. Therefore, since the fin part side of the holder main body is winded by a large amount of travel winds, the wiping performance can be further improved. Since sufficient downforce is obtained when the size of the fin part is not increased so much, weight of the wiper blade can be reduced with the appearance of the wiper blade improved.

According to the wiper blade of the present invention, an upstream-side lower-end surface part positioned in the upstream side of the flow direction of the travel wind and in the windshield side is provided in a short-side-direction first side of the holder main body; a downstream-side lower-end surface part positioned in the downstream side of the flow direction of the travel wind and in the windshield side is provided in a short-side-direction second side of the holder main body; the upstream-side lower-end surface part and the downstream-side lower-end surface part is formed so that the cross section of the holder main body along the short-side direction thereof has an arc shape; and the curvature factor of the upstream-side lower-end surface part is larger than the curvature factor of the downstream-side lower-end surface part. Therefore, the vertebrae can be disposed in both sides of the main-body part forming the blade rubber to reduce the height of the wiper blade, and excessive hitting of the travel wind can be suppressed. Accordingly, large load to the electric motor (worsening of drag) by moving the wiper blade over a wiping range can be suppressed. Moreover, since the curvature factor of the upstream-side lower-end surface part is larger than the curvature factor of the downstream-side lower-end surface part, the travel wind can move along the surface of the holder main body by being smoothly guided from the upstream-side lower-end surface part to the surface of the holder main body. Since generation of negative pressures caused by the detachment of the travel wind from the holder main body can be suppressed, the lifting force acting on the wiper blade can be stabilized (improvement of wiping performance).

According to the wiper blade of the present invention, since the holder main body is integrally provided with the fin part along the longitudinal direction thereof, the travel wind can move along the surfaces of the holder main body and the fin part by being smoothly guided from the upstream-side lower-end surface part to the surfaces of the holder main body and the fin part. Since generation of negative pressures caused by the detachment of the travel wind from the holder main body and the fin part can be suppressed, the lifting force acting on the wiper blade can be stabilized (improvement of wiping performance).

According to the wiper blade of the present invention, the upstream-side air-current surface part and the downstream-side air-current surface part are provided in the short-side-direction first side and the short-side-direction second side of the fin part, respectively, each of the air-current surface parts is formed so that the cross section along the short-side direction of the fin part has an arc shape, and the curvature factor of the upstream-side air-current surface part is smaller than the curvature factor of the downstream-side air-current surface part. Since the upstream-side air-current surface part is winded by a sufficient amount of travel winds, and sufficient downforce can be applied to the wiper blade.

According to the wiper blade of the present invention, a connecting surface part of which cross section along the short-side direction of the fin part has an arc shape is provided between the upstream-side lower-end surface part and the upstream-side current-flow surface part. Therefore, since the upstream-side lower-end surface part and the upstream-side current-flow surface part can be smoothly connected, worsening of the drag and lifting force acting on the wiper blade can be further suppressed.

According to the wiper blade of the present invention, since the holder main body and the fin part are two-color molded with materials of which hardness is different, the manufacturing step of the wiper blade can be simplified. For example, the fin part can be easily deformed by the travel winds while the holder main body has sufficient strength. In this case, the drag and lifting force acting on the wiper blade can be optimized in accordance with the strength of the travel winds.

BRIEF DESCRIPTIONS OF THE DRAWINGS

DESCRIPTIONS OF THE PREFERRED EMBODIMENT

The embodiments of the present invention are described with attached figures in detail.

Figure 1:
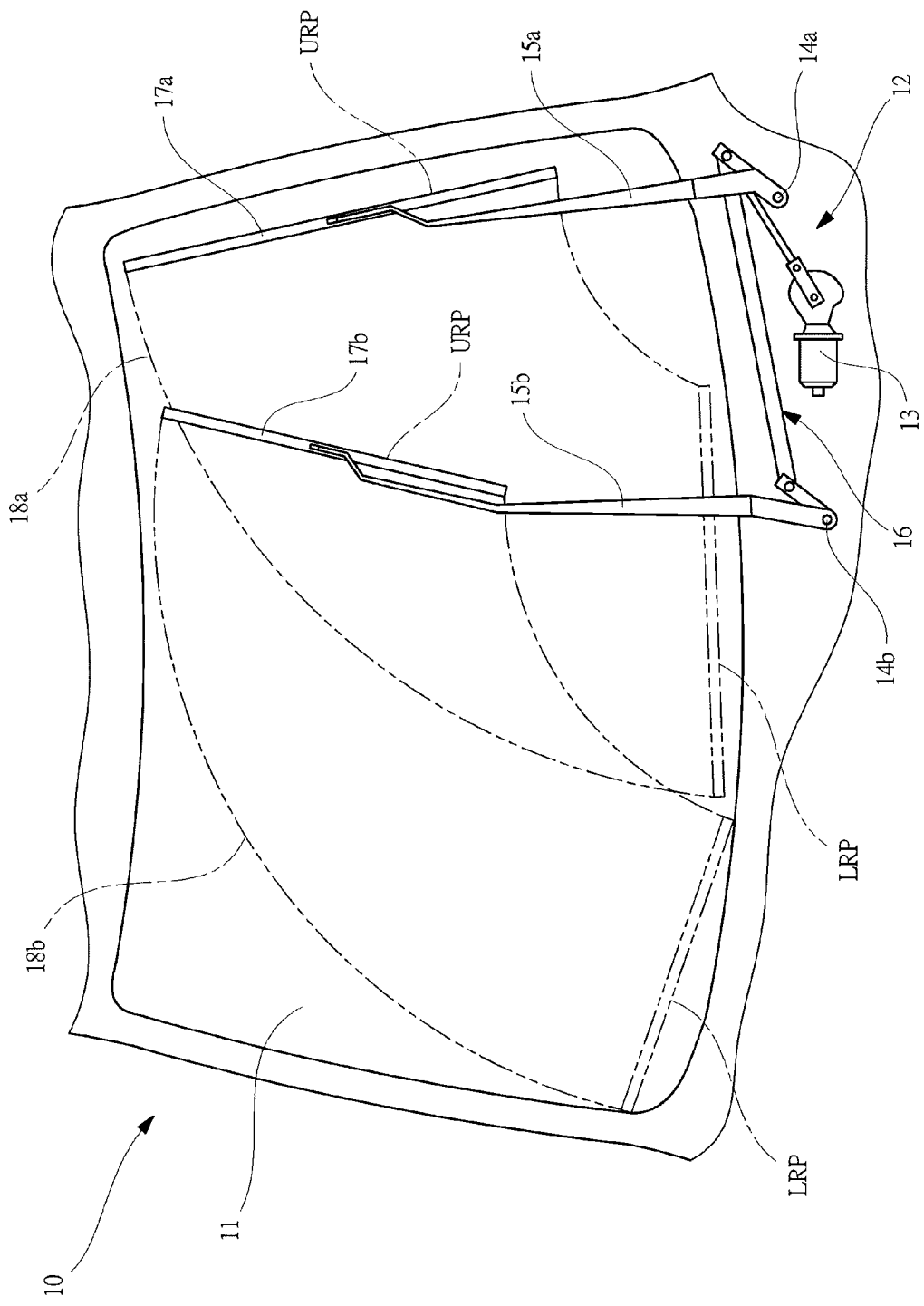
FIG. 1 is an explanatory drawing explaining a wiper device mounted on a vehicle.
Figure 2:
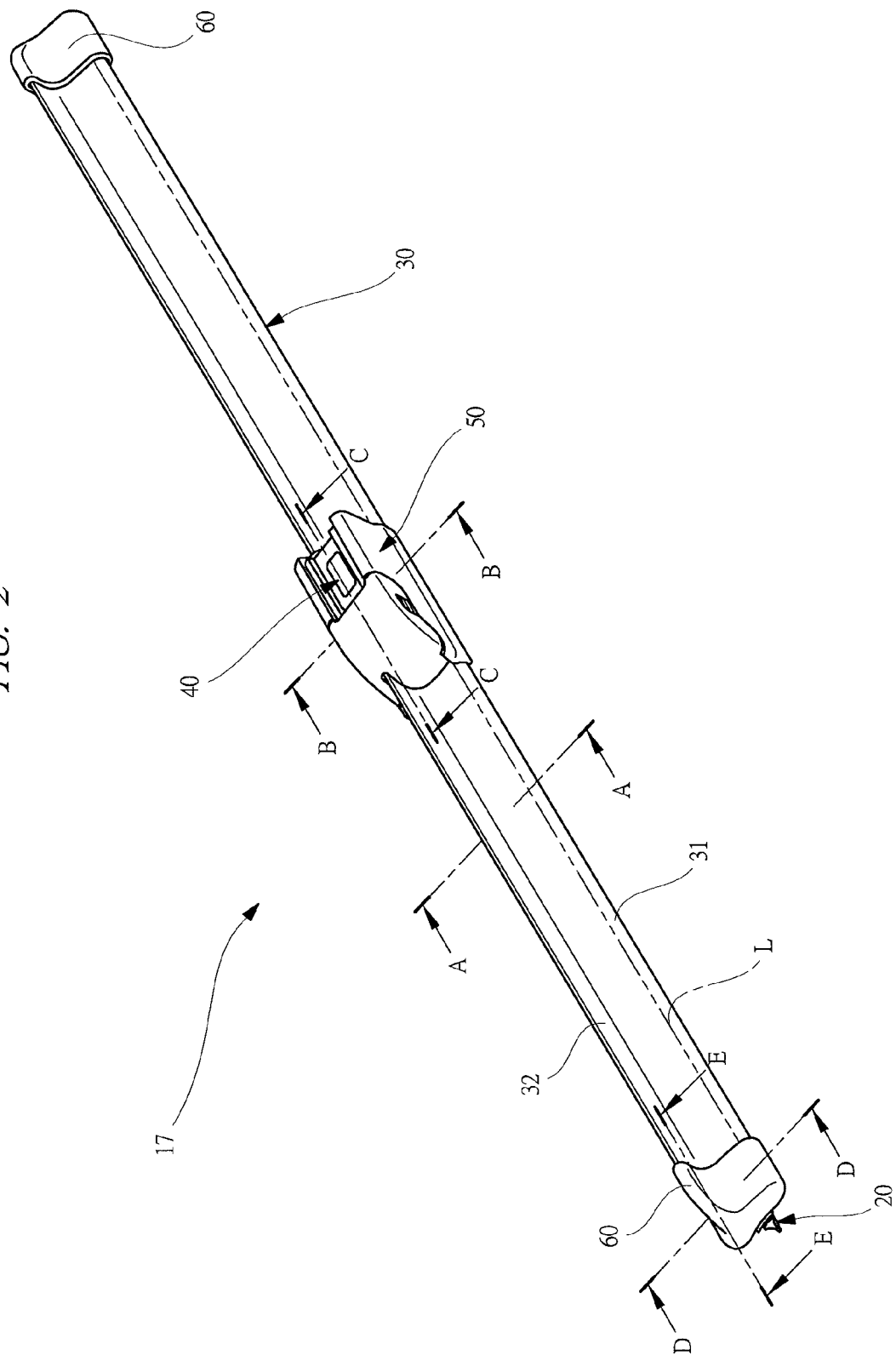
FIG. 2 is a perspective view showing a wiper blade of FIG. 1 in an enlarged manner.
Figure 3:
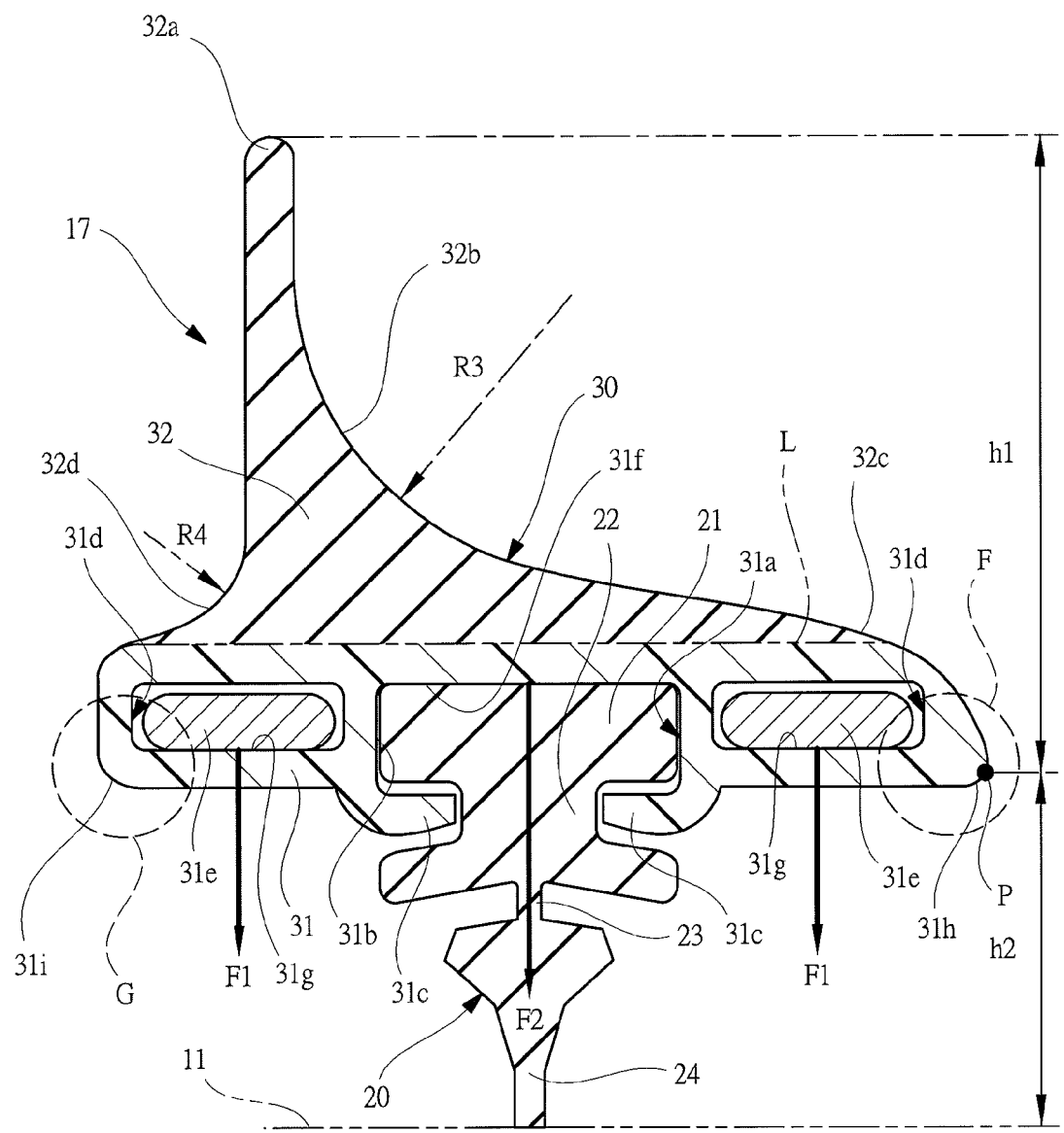
FIG. 3 is a cross sectional view taken along the line A-A of FIG. 2.
Figure 4A:
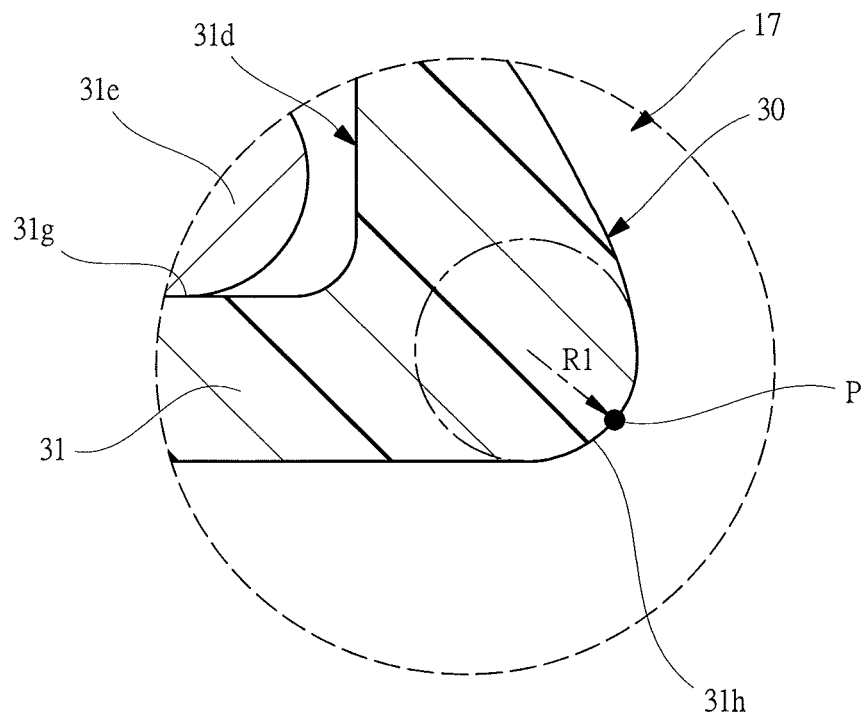
FIG. 4A is an enlarged view of the part of a broken-line circle F of FIG. 3
Figure 4B:
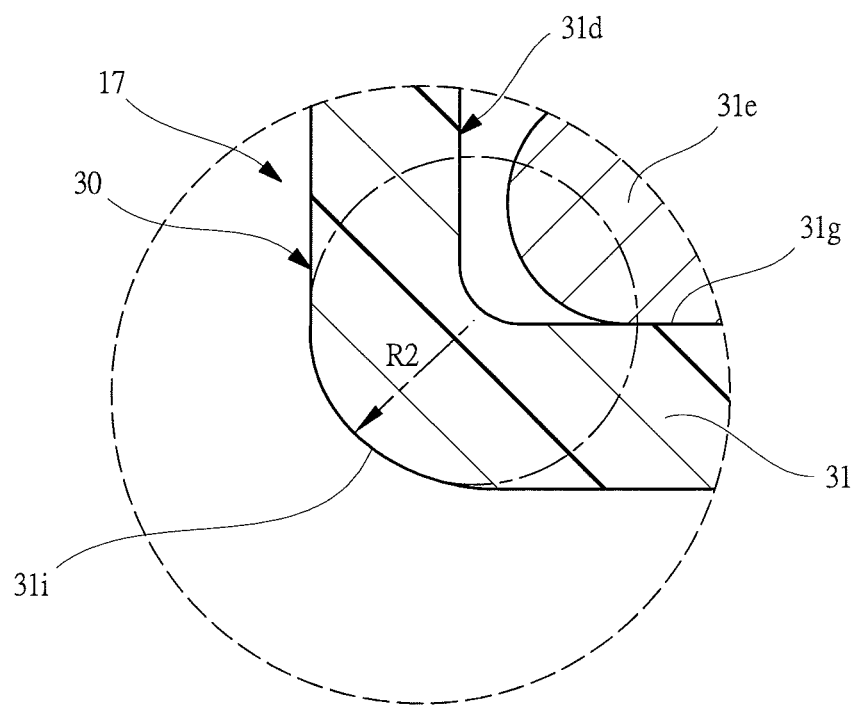
FIG. 4B is an enlarged view of the part of a broken-line circle G of FIG. 3.
Figure 5:
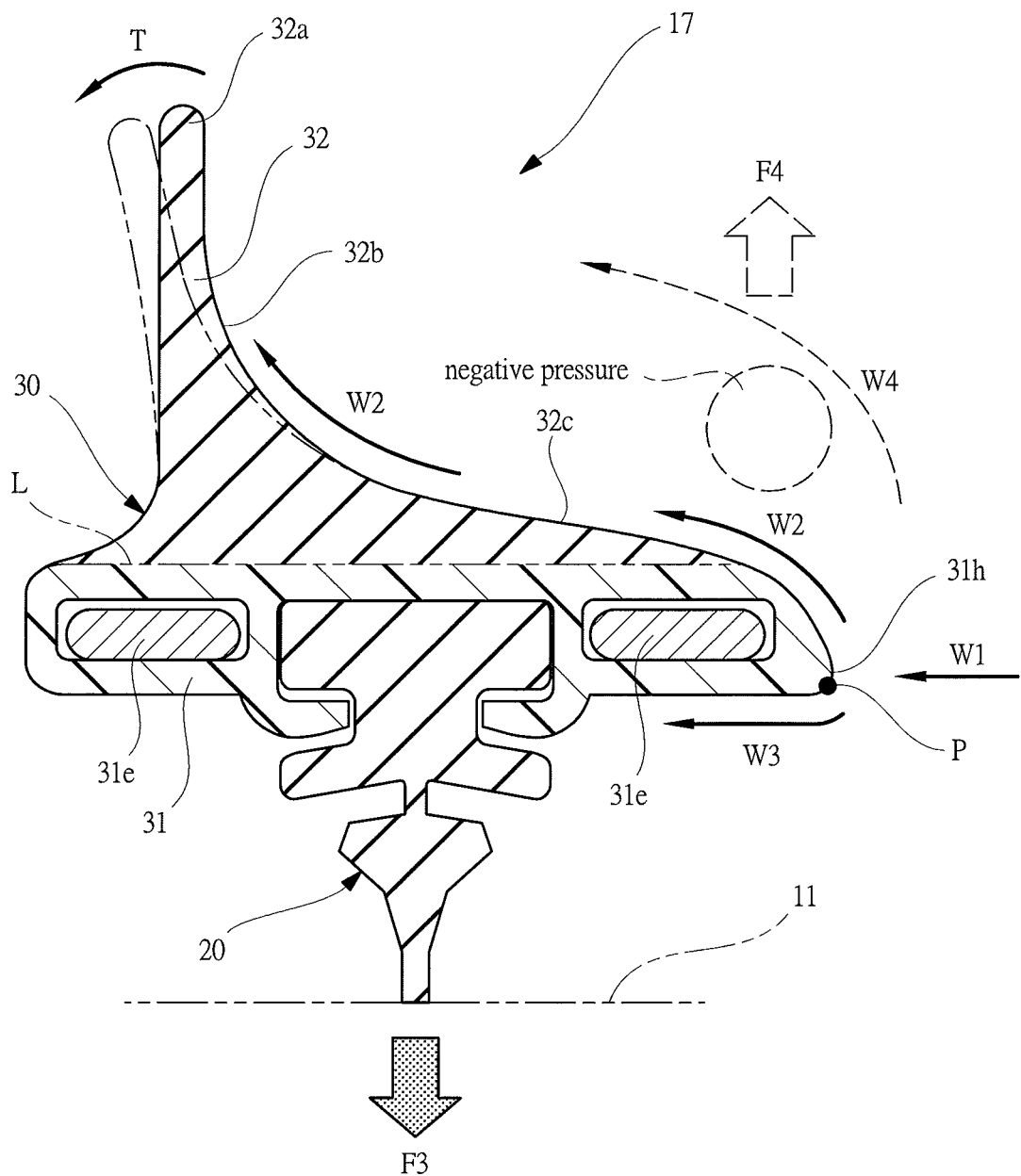
FIG. 5 is a cross sectional view explaining the state of flows of travel winds and corresponding to FIG. 3.

FIG. 1 is an explanatory drawing explaining a wiper device mounted on a vehicle; FIG. 2 is a perspective view showing a wiper blade of FIG. 1 in an enlarged manner; FIG. 3 is a cross sectional view taken along the line A-A of FIG. 2; FIG. 4A is an enlarged view of the part of a broken-line circle F of FIG. 3; FIG. 4B is an enlarged view of the part of a broken-line circle G of FIG. 3; and FIG. 5 is a cross sectional view explaining the state of flows of travel winds and corresponding to FIG. 3.

As shown in FIG. 1, a front glass 11 serving as a windshield is provided in a front side of a vehicle 10 such as an automobile, and a wiper device 12 for ensuring the view of a driver by wiping off rainwater, dust, etc. (not shown) attached onto the front glass 11 is provided in the front side of the front glass 11. The wiper device 12 is mounted, for example, in a bulkhead (not shown), which forms an engine room of the vehicle 10.

The wiper device 12 is provided with: a wiper motor 13 rotary driven as an electric motor by operating a wiper switch (not shown) provided, for example, in the vehicle; pivot shafts 14a and 14b of a driver-seat side (DR side) and a front passenger-seat side (AS side) rotatably provided on the vehicle 10; DR-side and AS-side wiper arms 15a and 15b of which base-end sides are fixed to the respective pivot shafts 14a and 14b and of which distal-end sides swingably move on the front glass 11; and a link mechanism 16 converting the rotary motion of the wiper motor 13 to the swinging motion of the wiper arms 15a and 15b.

DR-side and AS-side wiper blades 17a and 17b are similarly formed and turnably attached to the distal-end sides of the wiper arms 15a and 15b in the vertical direction of the front glass 11, respectively. The wiper blades 17a and 17b elastically contact with the front glass 11 by springs (not shown) provided in the wiper arms 15a and 15b. That is, the pressing force of the wiper arms 15a and 15b is transmitted to the wiper blades 17a and 17b, respectively. When the wiper motor 13 is rotatably driven, the wiper blades 17a and 17b is operated reciprocating wiping in wiping ranges 18a and 18b on the front glass 11 shown by two-dot-chain lines in the drawing, that is, between a lower reversing position (stop position of the wiper arm) LRP and an upper reversing position URP.

FIG. 2 shows the DR-side wiper blade, and, since the DR-side and AS-side wiper blades have similar configurations, hereinafter, only the DR-side wiper blade will be explained. The constituent parts of the DR-side wiper blade are simply referred to as "wiper blade" and so on without denoting them with "DR-side", and "a, b" at the ends of the symbols for distinguishing the DR-side and the AS-side are omitted.

As shown in FIG. 2, the wiper blade 17 is provided with: a blade rubber 20 contacting with the front glass 11; a holder member 30 retaining the blade rubber 20; an arm coupling member 40 provided at a longitudinal-direction intermediate part of the holder member 30; a cover 50 covering the arm coupling member 40; and a pair of end caps 60 attached to longitudinal-direction both-end parts of the holder member 30.

As shown in FIG. 3, the blade rubber 20 is provided with a main-body part 21, a body part 22, a neck part 23, and a lip part 24. The blade rubber 20 is formed to be elongated by extrusion molding of an elastic material such as rubber, and the cross sectional shape thereof has a uniform shape in all the entire area along the longitudinal direction. The thickness of the neck part 23 is set smaller than the thickness of the body part 22 and the neck part 23 is easily elastically deformed. As a result, sliding the wiper blade 17 on the front glass 11 allows the lip part 24 to incline, and a distal-end part of the lip part 24 therefore smoothly follows in the sliding direction of the wiper blade 17 and rainwater, dust, etc. attached onto the front glass 11 are completely wiped out.

The holder member 30 is provided with a holder main body 31 and a fin part 32. The holder main body 31 and the fin part 32 are integrated by two-color molding (extrusion molding) with materials having different hardness and formed to be elongated. Therefore, the manufacturing step of the wiper blade 17 can be simplified. A two-dot chain line L in the drawing shows a border line between the holder main body 31 and the fin part 32.

The holder main body 31 is formed of a flexible resin material such as plastic to be able to follow the front glass 11 and ensure sufficient strength enough to retain the blade rubber 20. A retaining part 31a extending along the longitudinal direction of the holder main body 31 is formed at a short-side-direction intermediate part of the holder main body 31 (intermediate part in the left-right direction in the drawing). The retaining part 31a is provided with a recess-shaped retaining groove 31b composed of a pair of lateral walls into which the main-body part 21 of the blade rubber 20 inserted, and an upper wall mutually coupling the pair of lateral walls. A gap is formed between the main-body part 21 and the retaining groove 31b, and the main-body part 21 is assembled with the retaining groove 31b via a gap. At the front glass 11 side (lower side in the drawing) of the retaining part 31a, a pair of retaining claws 31c supporting and covering the front glass 11 side of the main-body part 21 by covering and opposed to each other by sandwiching the body part 22, are provided at. The retaining part 31a formed of the retaining groove 31b and the retaining claws 31c to retain the main-body part 21 allows the blade rubber 20 to completely retain the holder main body 31 without removing.

A pair of housing parts 31d of which cross section is a substantially rectangular-shaped provided in short-side-direction both sides of the holder main body 31 (left/right sides in the drawing). Each of the housing part 31d is formed so as to extend along the longitudinal direction of the holder main body 31 as well as the retaining part 31a, and are provided so as to sandwich the retaining part 31a from the short-side-direction both sides of the holder main body 31. The height of each of the housing parts 31d from the front glass 11 is at substantially the same position as the height of the retaining part 31a from the front glass 11.

Plate-like vertebrae 31e composed of a steel material with a spring characteristic are housed in each of the housing parts 31d, and each of the vertebrae 31e is provided in the respective housing parts 31d movably, that is, in a non-fixed state in the longitudinal direction thereof. Therefore, the elastic force of the vertebrae 31e is efficiently transmitted to the holder main body 31 and the blade rubber 20. In a natural state in which no external force is applied, each of the vertebrae 31e is curved by a curvature factor larger than the curvature factor of the front glass 11 and makes the holder main body 31 and the blade rubber 20 elastically deform along the curvature factor of the front glass 11. Therefore, the entire area of the lip part 24 along the longitudinal direction tightly contacts with the front glass 11.

A rubber pressing part 31f corresponding to the upper wall of the retaining groove 31b pressing the main-body part 21 of the blade rubber 20 toward the front glass 11 and, is formed at the part of the retaining groove 31b opposite to the front glass 11. Each of holder pressing parts 31g pressing the holder main body 31 toward the front glass 11 by the elastic force of the respective vertebra 31e is formed in the parts of the housing parts 31d opposed to the front glass 11 and in the side closer to the front glass 11 than the rubber pressing part 31f.

Each of the vertebrae 31e presses the holder pressing parts 31g of the housing parts 31d by pressing force F1 (arrows in the drawing), and the pressing force F1 is transmitted to the rubber pressing part 31f as resultant force F2 (arrow in the drawing). As a result, the resultant force F2 is transmitted to the main-body part 21 via the rubber pressing part 31f, the holder main body 31 and the blade rubber 20 are elastically deformed along the curvature factor of the front glass 11. Therefore, the entire area to the lip part 24 tightly contacts with the front glass 11 in the longitudinal direction. Since the each of the holder pressing parts 31g is positioned in the side closer to the front glass 11 than the rubber pressing part 31f, the stable resultant force F2 can be transmitted to the rubber pressing part 31f, for example, even if the holder main body 31 is twisted, and the entire area of the lip part 24 along the longitudinal direction thereof can completely and tightly contacts with the front glass 11.

An upstream-side lower-end surface part 31h is provided in a first side of the short-side direction of the holder main body 31 (right side in the drawing). The upstream-side lower-end surface part 31h is positioned in the holder main body 31 in the upstream side of the flow direction of the travel winds and in the front glass 11 side. The cross section along the short-side direction of the holder main body 31 is formed into an arc shape having a radius R1 as shown in FIG. 4A. The flow direction of the travel winds is directed from the right side of the drawing toward the left side of the drawing. The wiper blade 17 is positioned at a lower reversing position LRP (stop position of the wiper arm), and, in this state, the travel winds hit the wiper blade 17.

A downstream-side lower-end surface part 31i is provided in a second side of the short-side direction of the holder main body 31 (left side in the drawing). The downstream-side lower-end surface part 31i is positioned in the holder main body 31 in the downstream side of the flow direction of the travel winds and in the front glass 11 side. The cross section along the short-side direction of the holder main body 31 is formed into an arc shape having a radius R2 as shown in FIG. 4B. The radius R2 of the downstream-side lower-end surface part 31i is set larger than the radius R1 of the upstream-side lower-end surface part 31h (R2>R1), that is, the curvature factor of the upstream-side lower-end surface part 31h is set larger than the curvature factor of the downstream-side lower-end surface part 31i. Thus, the holder main body 31 makes the upstream side of the flow direction of the travel winds sharpen, and the travel winds can be smoothly guided along the holder main body 31 and the fin part 32 from a travel-wind branching point P toward the left side in the drawing.

The travel-wind branching point P is formed in the most distal-end side (rightmost side in the drawing) in the upstream side of the flow direction of the travel winds along the short-side direction of the holder main body 31, and the travel-wind branching point P divides the travel winds directed toward the wiper blade 17 into the fin part 32 side of the holder main body 31 and the blade rubber 20 side of the holder main body 31.

As shown in FIG. 3, the fin part 32 is formed of an elastic material such as rubber to be elongated, and the fin part is integrally provided with the holder main body 31 along in the longitudinal direction. The hardness of the fin part 32 is set to the hardness lower than the hardness of the holder main body 31. Therefore, the fin part 32 can be elastically deformed by the wind pressure of the travel winds (see FIG. 5).

The fin part 32 is provided in the side of the holder main body 31 that is opposite to the front glass 11 side, and a vertex part 32*a* furthest from the front glass 11 is formed at the distal-end side thereof (upper side in the drawing). The vertex part 32*a* is disposed in the downstream side of the flow direction of the travel winds along the short-side direction of the holder main body 31 (left side in the drawing) and, the blade rubber 20 is disposed in the upstream side of the flow direction of the travel winds of the fin part 32 (right side in the drawing). Therefore, the downforce (not shown) generated when the travel winds hit the fin part 32 can be efficiently applied to the blade rubber 20.

An upstream-side air-current surface part 32*b* along which the travel winds flow is provided in the first side of the short-side direction of the fin part 32 (right side in the drawing), at the upstream-side air-current surface part 32*b*, the cross section thereof along the short-side direction of the fin part 32 has an arc shape, and the radius of the part 32*b* is set to a radius R3. A connecting surface part 32*c* of which cross section along the short-side direction of the fin part 32 has an arc shape is provided between the upstream-side air-current surface part 32*b* and the upstream-side lower-end surface part 31*h*. The connecting surface part 32*c* smoothly and continuously connects the upstream-side air-current surface part 32*b* and the upstream-side lower-end surface part 31*h*. A downstream-side air-current surface part 32*d* set to have a radius R4 is provided in the second side of the short-side direction of the fin part 32 (left side in the drawing), and the cross section thereof along the short-side direction of the fin part 32 is formed to have an arc shape.

The radius R3 of the upstream-side air-current surface part 32*b* is set larger than the radius R4 of the downstream-side air-current surface part 32*d* (R3>R4), that is, the curvature factor of the upstream-side air-current surface part 32*b* is set smaller than the curvature factor of the downstream-side air-current surface part 32*d*. Therefore, a sufficient amount of travel winds can hit the upstream-side air-current surface part 32*b*, and the amount of the downforce applied to the blade rubber 20 can be sufficiently increased. The length (height) h1 from the travel-wind branching point P to the vertex part 32*a* is set to be longer than the length (height) h2 from the travel-wind branching point P to the distal end of the lip part 24 (h1>h2), therefore a large amount of travel winds hit the fin part 32 side of the holder main body 31. That is, sufficient downforce is obtained even if the size of the fin part 32 does not largely increase. It leads to weight reduction of the wiper blade 17 and improvement of the appearance of the wiper blade 17.

The state of flows of travel winds will be explained based on FIG. 5. When the wiper blade 17 receives a travel wind W1, the travel wind W1 is divided by the travel-wind branching point P into a travel wind W2 of the fin part 32 side and a travel wind W3 of the blade rubber 20 side. At this point, since the travel-wind branching point P is formed on the upstream-side lower-end surface part 31*h*, most of the travel wind W1 flows to the fin part 32 side as the travel wind W2.

The travel wind W2 flows from the upstream-side lower-end surface part 31*h* toward the vertex part 32*a* along the connecting surface part 32*c* and the upstream-side air-current surface part 32*b*, and then, flows to the second side of the short-side direction of the holder main body 31 (left side in the drawing) via the vertex part 32*a*. Since the upstream-side lower-end surface part 31*h* and the upstream-side air-current surface part 32*b* are smoothly connected by the connecting surface part 32*c*, detachment of a travel wind W4 from the surfaces of the holder main body 31 and the fin part 32 as shown by a broken line in the drawing does not occur, and a negative pressure (broken-line circle in the drawing) is not generated in the upper side of the upstream-side air-current surface part 32*b* in the drawing. Therefore, lifting force F4 lifting up the wiper blade 17 to the upper side in the drawing is not generated, sufficiently-large stable lifting force F3 (downforce) can be applied toward the front glass 11 by the wind pressure of the travel wind W2, and the wiping performance of the wiper blade 17 is improved.

If the travel wind W2 is too strong, as shown by an arrow T in the drawing, the narrow vertex part 32*a* side of the fin part 32 is bent, and the travel wind W2 is released to the second side of the short-side direction of the holder main body 31. Therefore, excessive increase of the lifting force F3 can be suppressed, and the amount of the lifting force F3 can be optimized. Similarly, movement of the wiper blade 17 over the wiping range 18*a* or 18*b* (see FIG. 1) by the travel wind W2 can be suppressed, and overloading (excessive load) to the wiper motor 13 (see FIG. 1) can be prevented.

Figure 6:
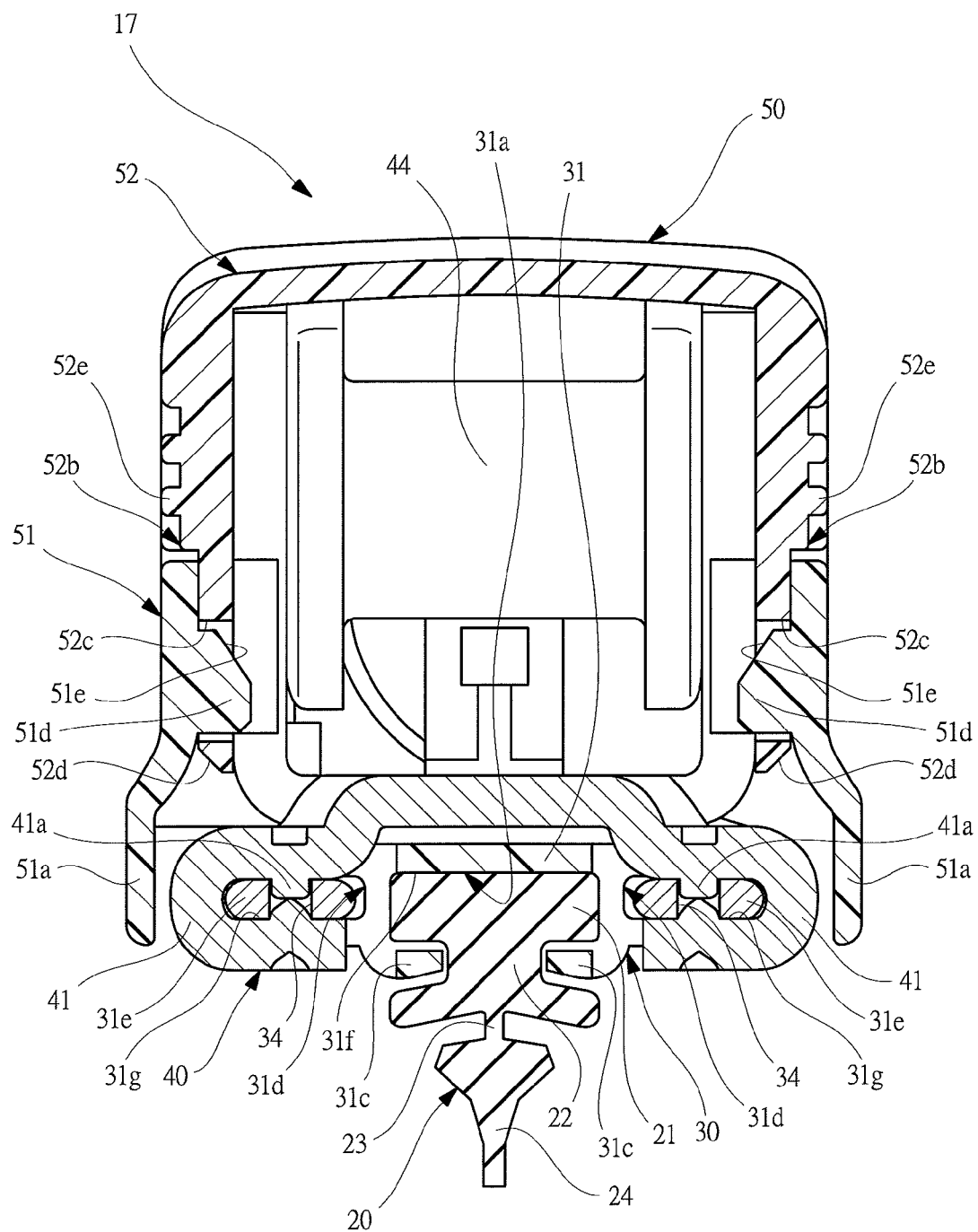
FIG. 6 is a cross sectional view taken along the line B-B of FIG. 2.
Figure 7:
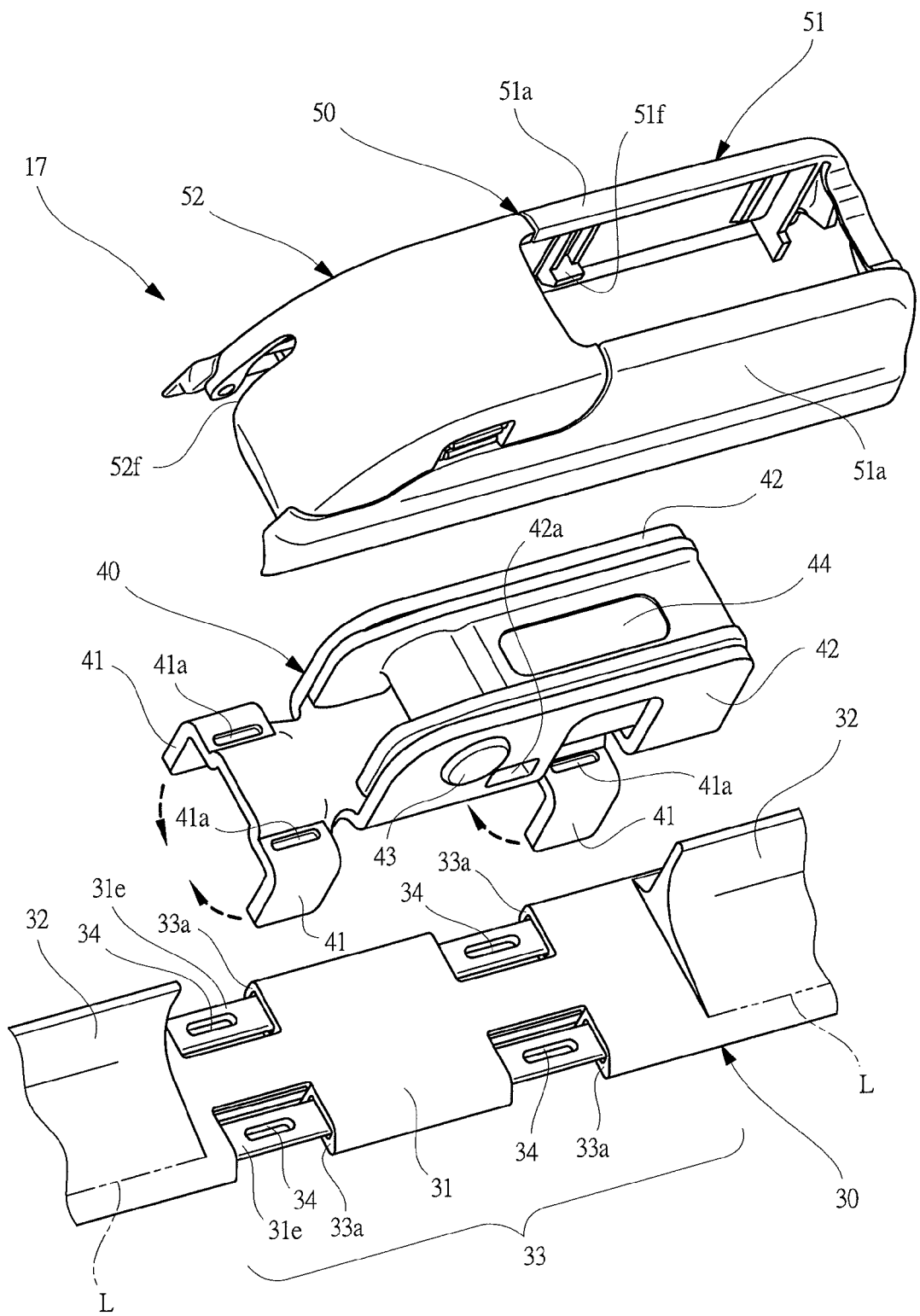
FIG. 7 is an exploded perspective view showing a coupling structure (center part) of the vertebrae.
Figure 8:
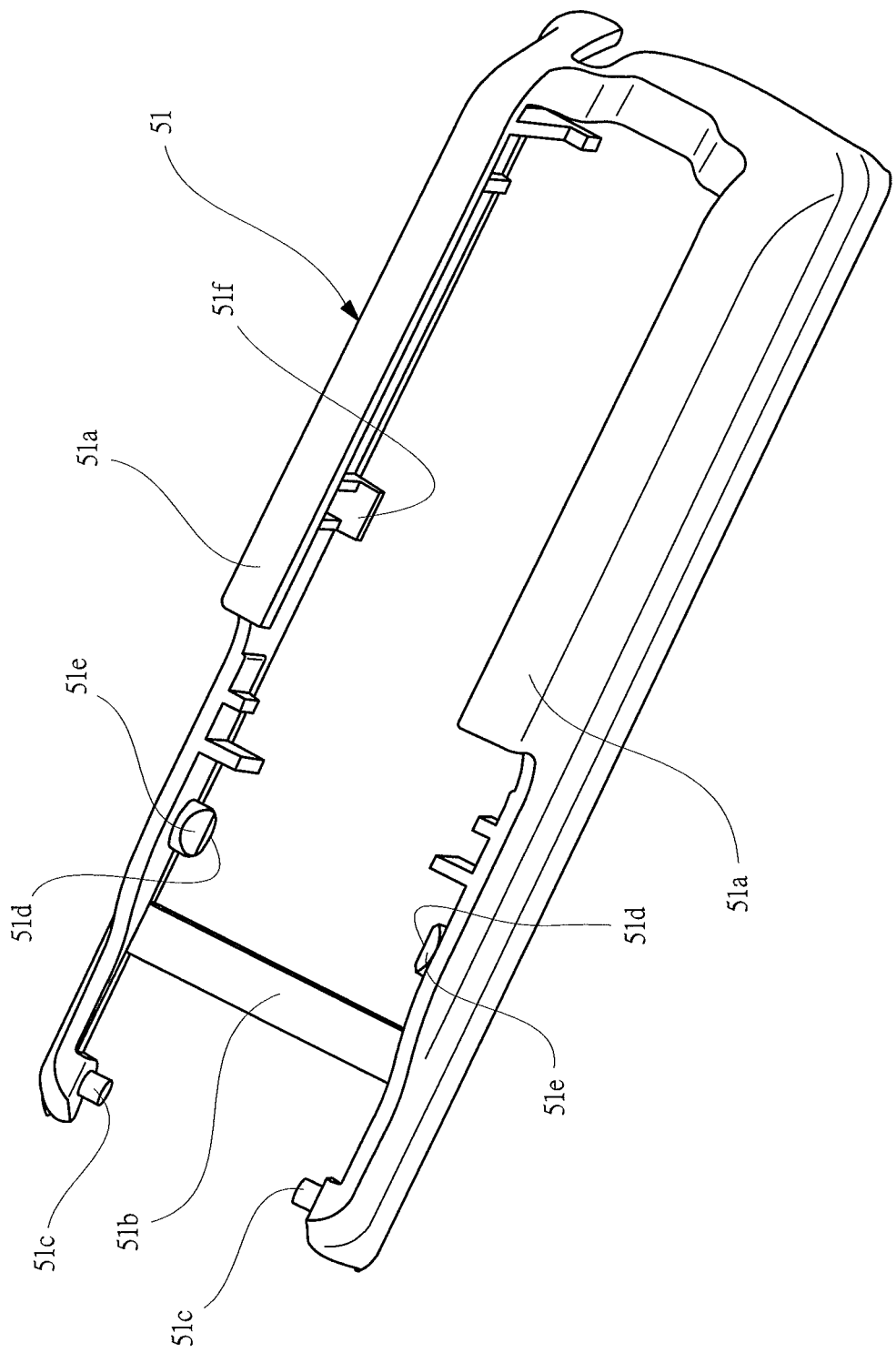
FIG. 8 is a perspective view showing a detailed structure of a first cover member.
Figure 9:
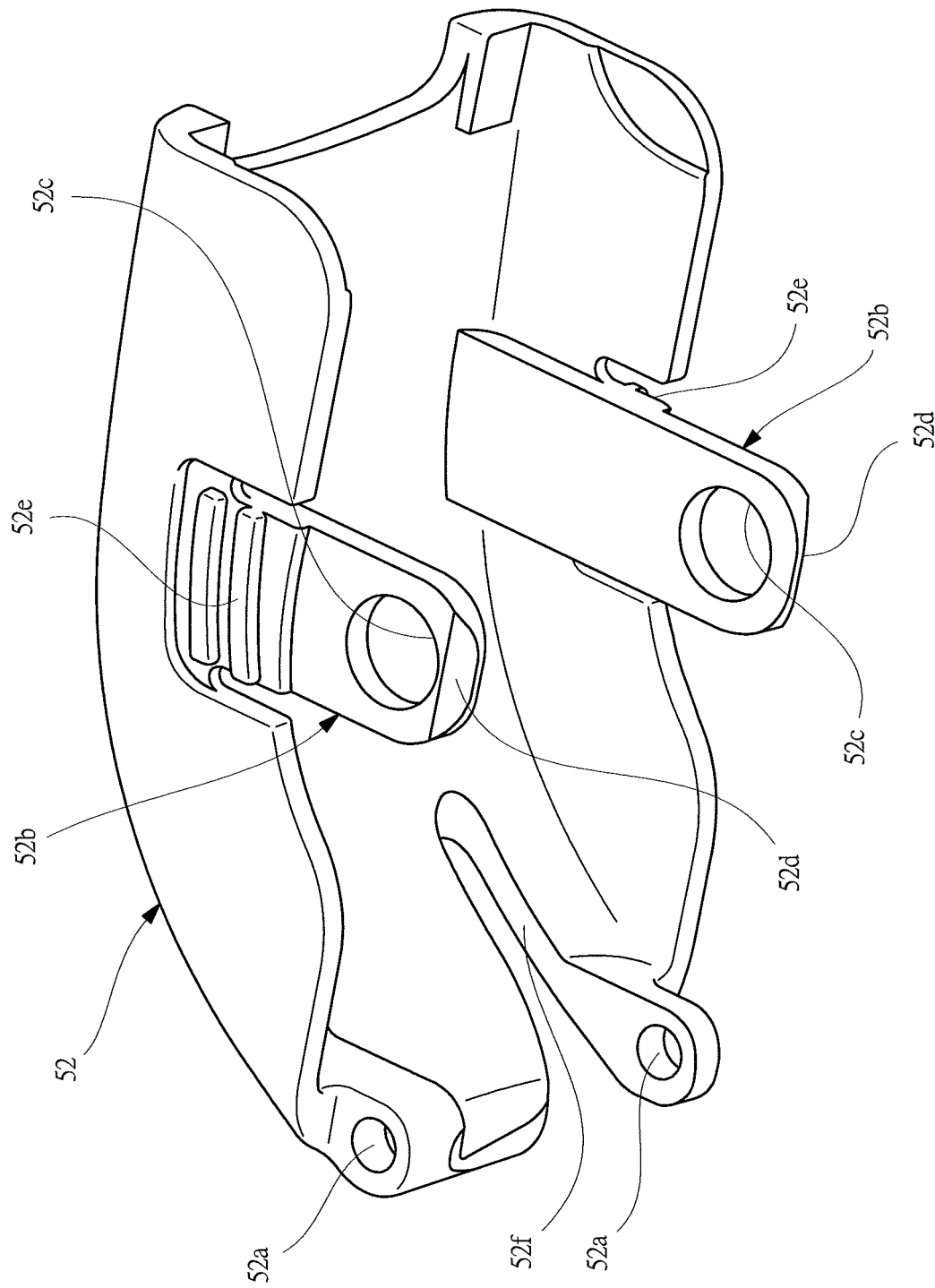
FIG. 9 is a perspective view showing a detailed structure of a second cover member.
Figure 10:
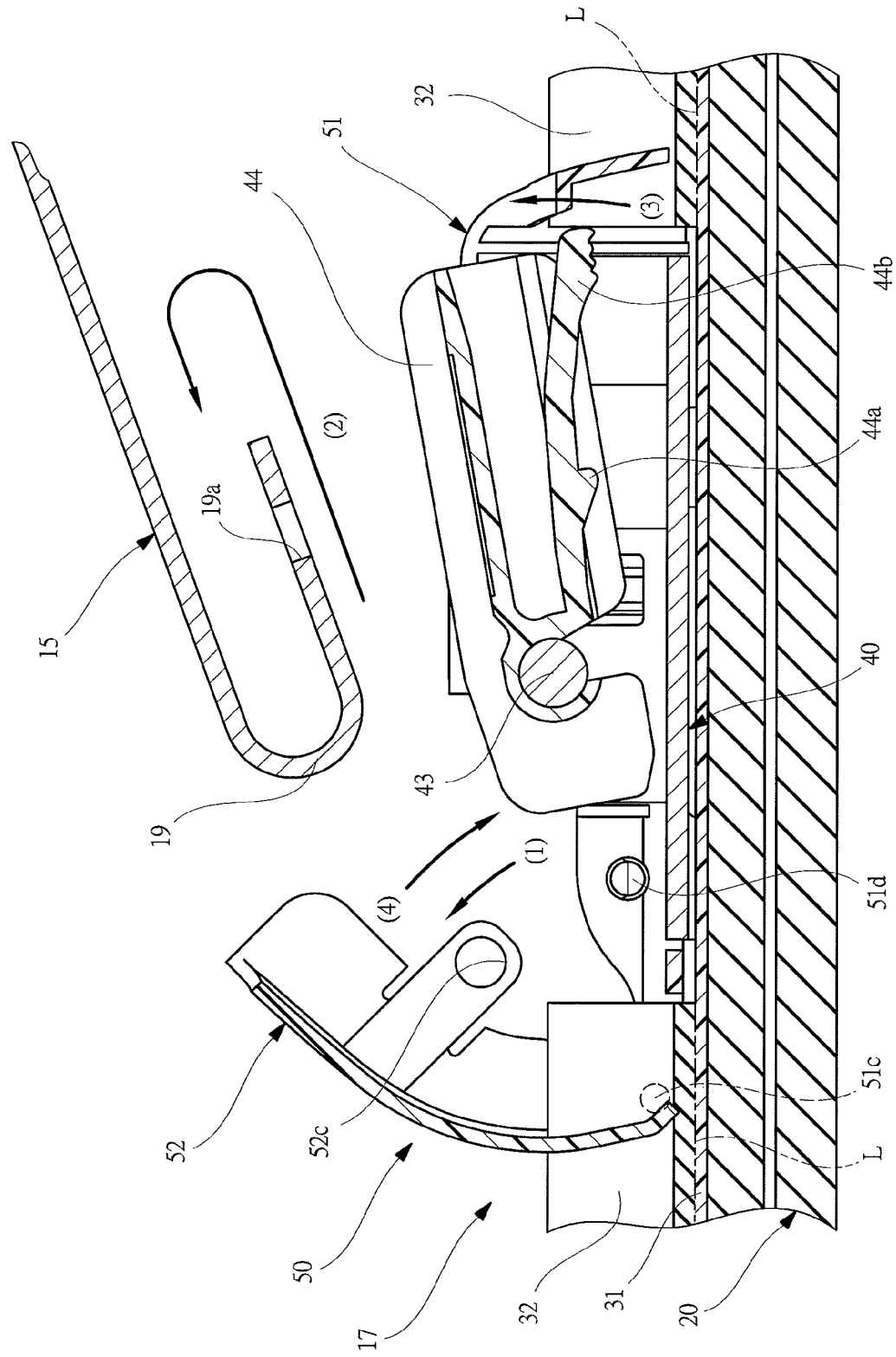
FIG. 10 is a cross sectional view taken along the line C-C of FIG. 2 explaining a procedure of attaching the wiper blade to the wiper arm.

FIG. 6 is a cross sectional view taken along the line B-B of FIG. 2; FIG. 7 is an exploded perspective view showing a coupling structure (center part) of the vertebrae; FIG. 8 is a perspective view showing a detailed structure of a first cover member; FIG. 9 is a perspective view showing a detailed structure of a second cover member; and FIG. 10 is a cross sectional view taken along the line C-C of FIG. 2 explaining a procedure of attaching the wiper blade to the wiper arm.

As shown in FIGS. 6 and 7, the arm coupling member 40 and the cover 50 are provided at an intermediate part along the longitudinal direction of the holder main body 31. A coupling-member attaching part 33 is formed at the intermediate part along the longitudinal direction of the holder main body 31 by cutting away part of the fin part 32. The coupling-member attaching part 33 is provided with four cut-away parts 33*a* for exposing the vertebrae 31*e* corresponding to the coupling-member attaching part 33, to outside. The cut-away parts 33*a* are formed by cutting away part of the holder main body 31; long holes 34 extending along the longitudinal directions of the vertebrae 31*e* are provided on the vertebrae 31*e* exposed from the cut-away parts 33*a*; and the long holes 34 penetrate through the vertebrae 31*e* in the thickness direction thereof (top-bottom direction in the drawing).

The arm coupling member 40 is formed into a predetermined shape by pressing a steel plate. The arm coupling member 40 is provided with: four swaging leg parts 41 (three of them are shown in the drawing), a pair of main-body wall parts 42, a turning pin 43 fixed to the main-body wall part 42, and a hook attaching member 44 rotatably provided on the turning pin 43. The swaging leg parts 41 and the main-body wall part 42 are bent directed toward mutually opposite directions, and the swaging leg parts 41 are fixed by swaging to the vertebrae 31e exposed from the cut-away parts 33a.

As shown in FIG. 6, positioning projected parts 41a are formed in the base-end side of the swaging leg parts 41, and the positioning projected parts 41a are inserted into the long holes 34. Therefore, the arm coupling member 40 can be assembled and positioned with good accuracy to the vertebrae 31e. With the positioning projected parts 41a positioned at the long holes 34, the distal-end sides of the swaging leg parts 41 are bent by using an unshown swaging jig as shown by broken-line arrows in FIG. 7; the arm coupling member 40 can be firmly fixed to the vertebrae 31e.

Upon swaging fixation of the swaging leg parts 41, the holder main body 31 corresponding to the coupling-member attaching part 33 undergoes elastic deformation. Therefore, it is not occurred a problem on the arm coupling member 40 such as rattling to the vertebrae 31e. In the present embodiment, steel materials (the arm coupling member 40 and the vertebrae 31e) are mutually fixed by swaging fixation; it is not necessary to worry about melting of, for example, the holder main body 31 caused in the case of fixation by welding or the like.

The turning pin 43 of a cylindrical steel material is fixed to the main-body wall parts 42 and extends along the short-side direction of the holder main body 31. The turning pin 43 is fixed between the main-body wall parts 42 by swaging fixation of the axial-direction both-end sides thereof, and the hook attaching member 44 formed to a predetermined shape with a resin material such as plastic is rotatably provided at the turning pin 43. A U-shaped hook 19 (see FIG. 10) formed at the distal-end part of the wiper arm 15 is coupled to the hook attaching member 44. Thus, the pressing force of the wiper arm 15 is transmitted to the vertebrae 31e via the hook attaching member 44, the turning pin 43, and the arm coupling member 40. The pressing force of the wiper arm 15 and the elastic force of the vertebrae 31e are transmitted from the same height to the blade rubber 20, and the pressing force F1 shown in FIG. 3 also includes the pressing force of the wiper arm 15.

Each of through holes 42a (one of them is shown in the drawing) penetrating along the short-side direction of the holder main body 31 is provided in the vicinities of the turning pin 43 in the main-body wall parts 42. Each of claw parts 51f (one of them is shown in the drawing) formed on a first cover member 51 forming the cover 50 is inserted into the through holes 42a. Therefore, the cover 50 is fixed to the arm coupling member 40.

The cover 50 is for covering the arm coupling member 40 and the coupling-member attaching part 33 to improve the appearance of the wiper blade 17, and is provided with the first cover member 51 and a second cover member 52. The cover members 51 and 52 are formed into predetermined shapes by injection molding of a melted plastic material and so on.

As shown in FIG. 8, the first cover member 51 is formed into a substantially U-shape and provided with a pair of arm parts 51a extending along the longitudinal direction of the holder main body 31. A coupling part 51b mutually coupling the distal-end sides of the arm parts 51a is provided in the distal-end side of the arm parts 51a (left side in the drawing) and ensures predetermined strength so that the arm parts 51a are not separated each other.

A pair of pins 51c rotatably supporting the second cover member 52, is provided in the side closer to the distal end than the coupling part 51b of each of the arm parts 51a. Each of the pins 51c is inserted in each of pin holes 52a provided in the second cover member 52. A pair of lock pins 51d retaining the second cover member 52 in a closed state is provided in the side closer to the base end than the coupling part 51b of each of the arm parts 51a (right side in the drawing), and each of the lock pins 51d is inserted in lock holes 52c provided in each of the lock claws 52b of the second cover member 52. Guiding inclined surfaces 51e guiding climb-over of the distal-end sides of each of the lock claws 52b are provided on each of the lock pins 51d; the second cover member 52 can be easily closed.

A pair of claw parts 51f (one of them is shown in the drawing) fixing the cover 50 to the arm coupling member 40 is provided in the side closer to the base end than each of the lock pins 51d of each of the arm parts 51a, and each of the claw parts 51f is inserted in each of the through holes 42a provided in the arm coupling member 40. When the first cover member 51 is fixed to the arm coupling member 40, each of the claw parts 51f is inserted into each of the through holes 42a while elastically deforming each of the arm parts 51a outward. Therefore, the cover 50 is not easily detached from the arm coupling member 40.

As shown in FIG. 9, the second cover member 52 is formed into a substantially bowl-like shape, and a pair of pin holes 52a is provided in the distal-end side of the second cover member 52 (left side in the drawing). Each of the pins 51c of the first cover member 51 is rotatably inserted in each of the pin holes 52a. Therefore, the second cover member 52 is rotatable about each of the pins 51c to the first cover member 51 (see FIG. 10).

A pair of lock claws 52b are provided at intermediate parts of the second cover member 52 along the longitudinal direction thereof. The lock holes 52c are formed in the distal-end sides of the lock claws 52b (lower side in the drawing), and each of the lock pins 51d provided on the first cover member 51 is inserted in each of the lock holes 52c. A guiding inclined surface 52d slidingly contacting with each of the guiding inclined surface 51e provided on each of the lock pin 51d and guides engagement of each of the lock pin 51d with each of the lock hole 52c, is provided on the distal-end side of each of the lock claws 52b.

Holding parts 52e are provided in the base-end sides of each of the lock claws 52b (upper side in the drawing) and each of the holding parts 52e is formed to a recessed/projected shape to facilitate holding. The engagement of each of the lock pins 51d with each of the lock holes 52c can be released by holding each of the holding parts 52e, elastically deforming each of the lock claws 52b so as to be close to each other, and pulling up the second cover member 52 in this state and thus, the second cover member 52 can be opened.

A cut-away groove 52f is provided in the distal-end side of the second cover member 52. The fin part 32 of the holder member 30 is inserted in the cut-away groove 52f, and the second cover member 52 can be therefore smoothly opened/closed. The fin part 32 does not contact with the cut-away groove 52f and the fin part 32 is prevented from damaging causing along opening/closing of the second cover member 52.

A procedure for attaching the wiper blade 17 to the wiper arm 15 will be explained based on FIG. 10. First, as shown by an arrow (1), the second cover member 52 forming the cover 50 is rotated and opened to the first cover member 51, and, space into which the U-shaped hook 19 of the wiper arm 15 inserted is generated in the front-side of the hook attaching member 44 (left side in the drawing). Then, as shown by an arrow (2), the wiper blade 17 is moved, and the hook attaching member 44 is inserted to the inside of the U-shaped hook 19.

An engagement hole 19a is provided in the U-shaped hook 19, and an operating piece 44b having an engagement projected part 44a is provided in the hook attaching member 44. Therefore, when the hook attaching member 44 is inserted to the inside of the U-shaped hook 19, the engagement projected part 44a is inserted in the engagement hole 19a, and attachment of the wiper blade 17 to the wiper arm 15 is completed. When the wiper blade 17 is detached from the wiper arm 15, the operating piece 44b is operated in the direction of an arrow (3) to cancel the engagement between the engagement projected part 44a and the engagement hole 19a, and the hook attaching member 44 is removed from the inside of the U-shaped hook 19.

Then, as shown by an arrow (4), the second cover member 52 is closed by rotating the second cover member to the first cover member 51, and each of the lock pins 51d are inserted in each of the lock holes 52c. As a result, attachment of the wiper blade 17 to the wiper arm 15 and attachment of the cover 50 are completed.

Figure 11:
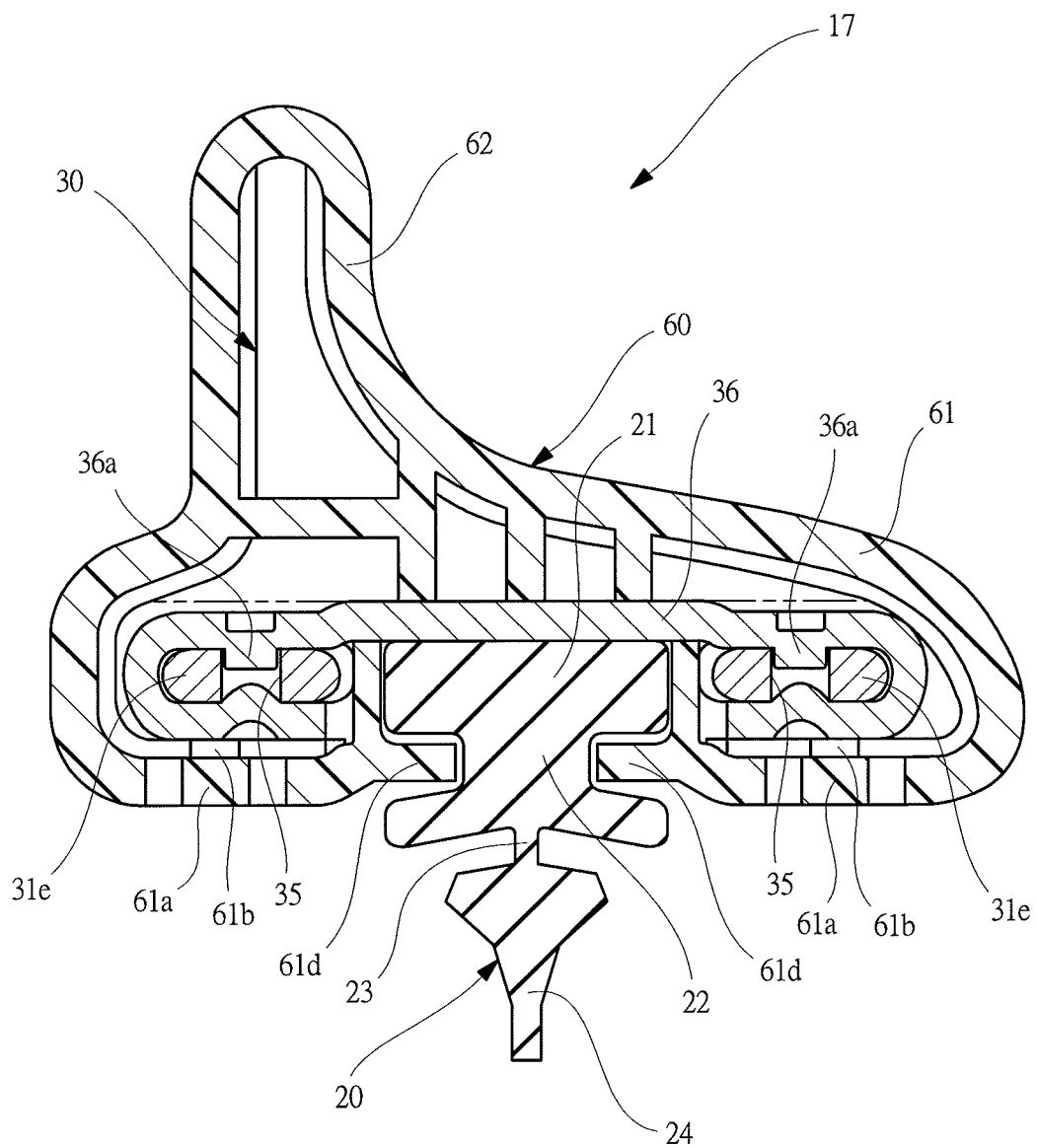
FIG. 11 is a cross sectional view taken along the line D-D of FIG. 2.
Figure 12:
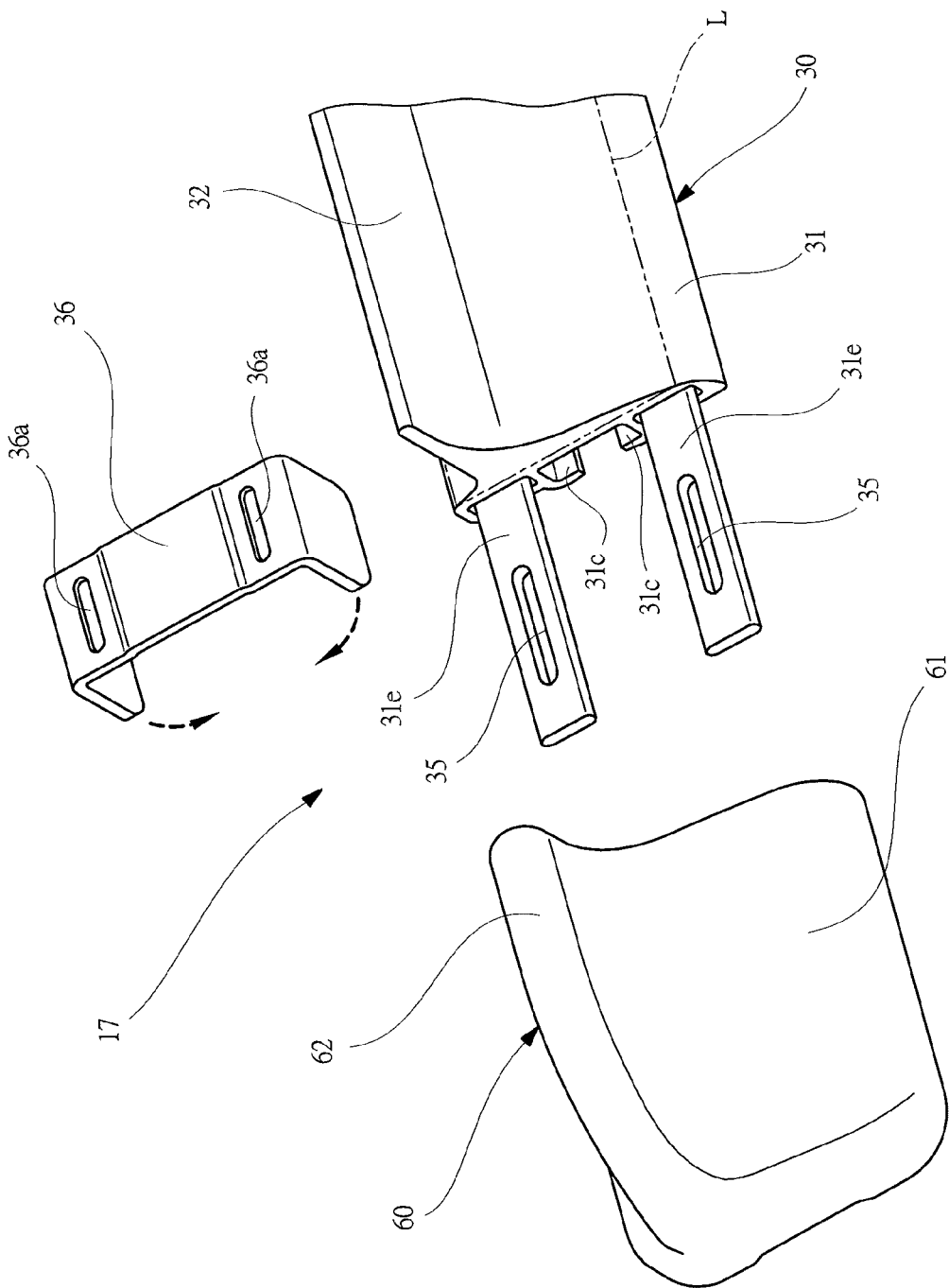
FIG. 12 is an exploded perspective view showing a coupling structure (end part) of the vertebrae.
Figure 13A:
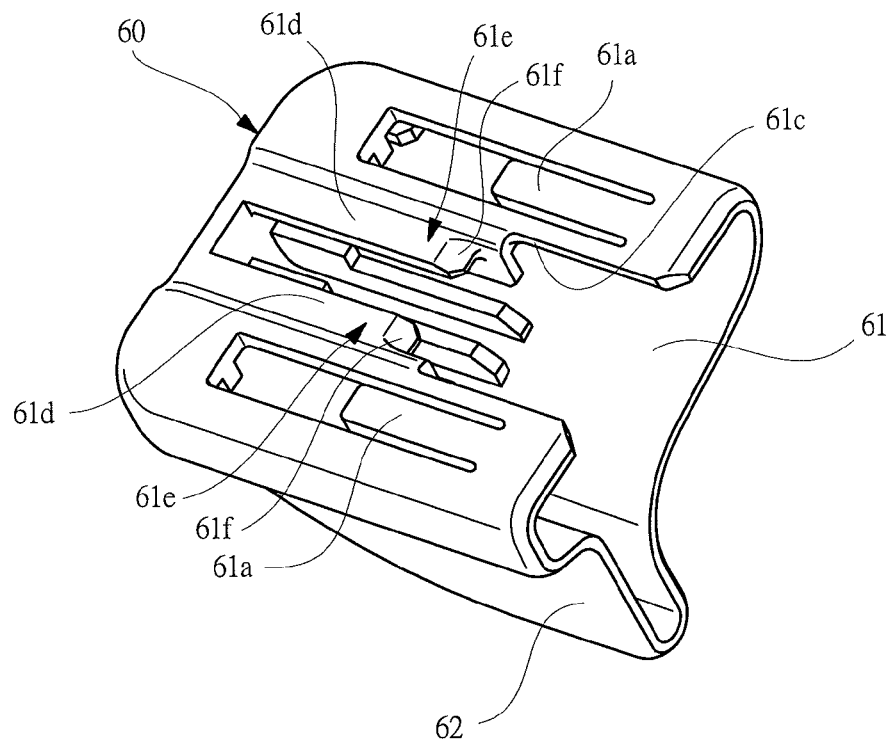
FIGS. 13A and 13B are perspective views explaining a detailed structure of the end cap.
Figure 13B:
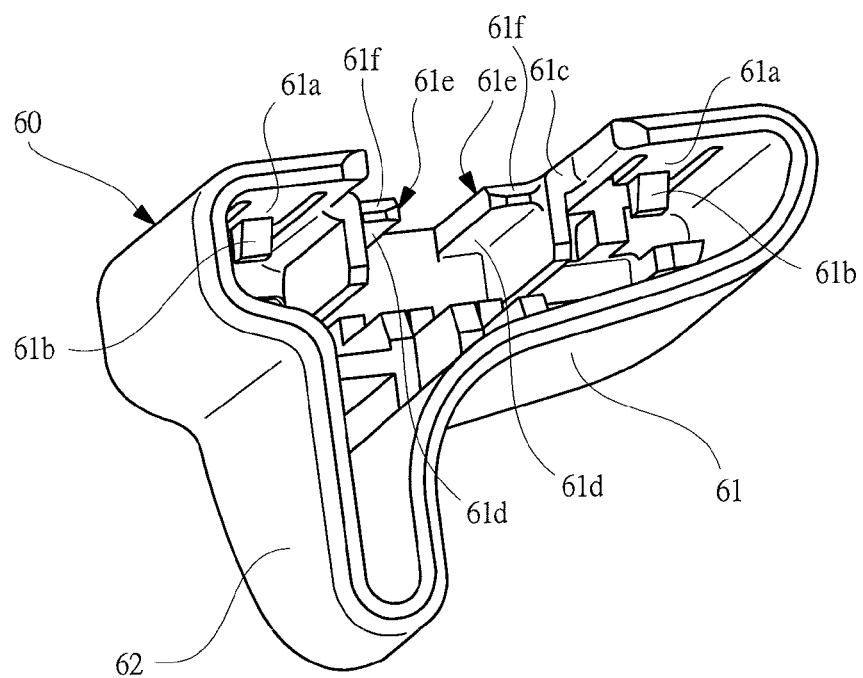
Figure 14A:
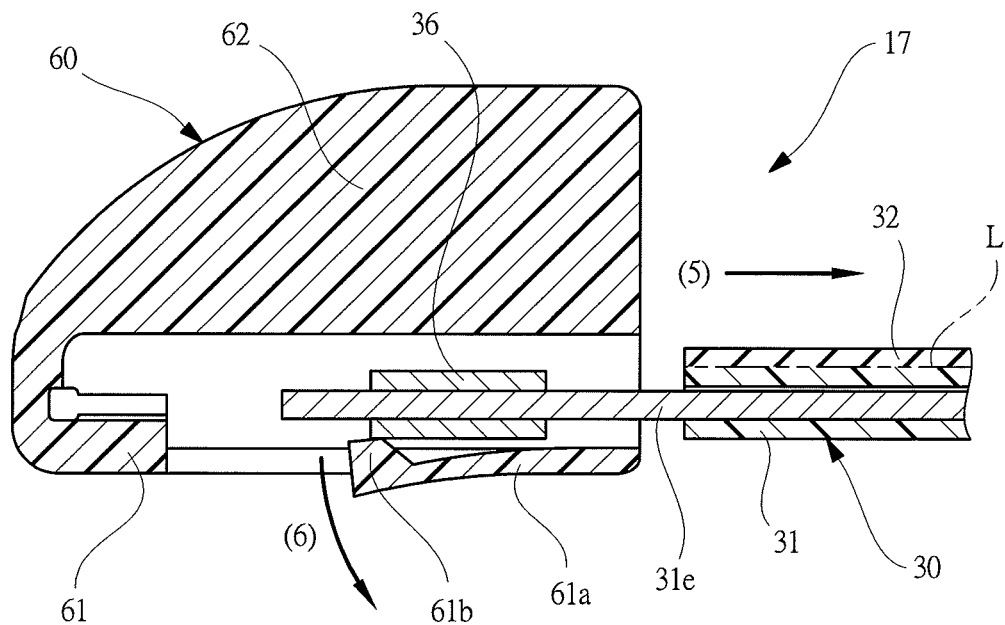
FIGS. 14A and 14B are cross sectional views taken along the line E-E of FIG. 2 for explaining a procedure of attaching the end cap to the holder member.
Figure 14B:
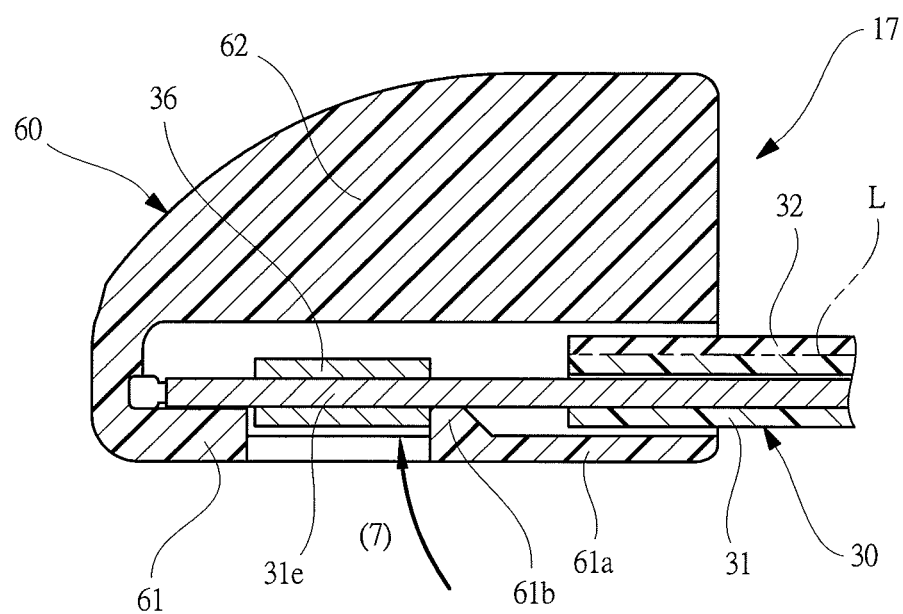
Figure 15A:
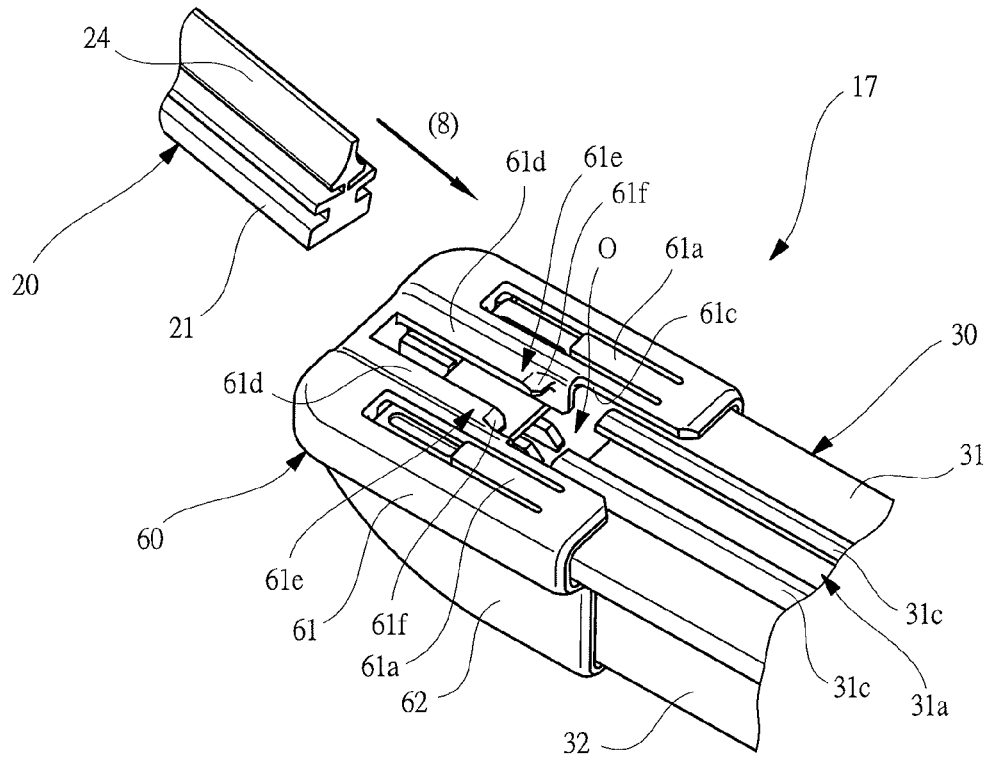
FIGS. 15A and 15B are perspective views explaining a procedure of attaching the blade rubber to the holder member (initial stage).
Figure 15B:
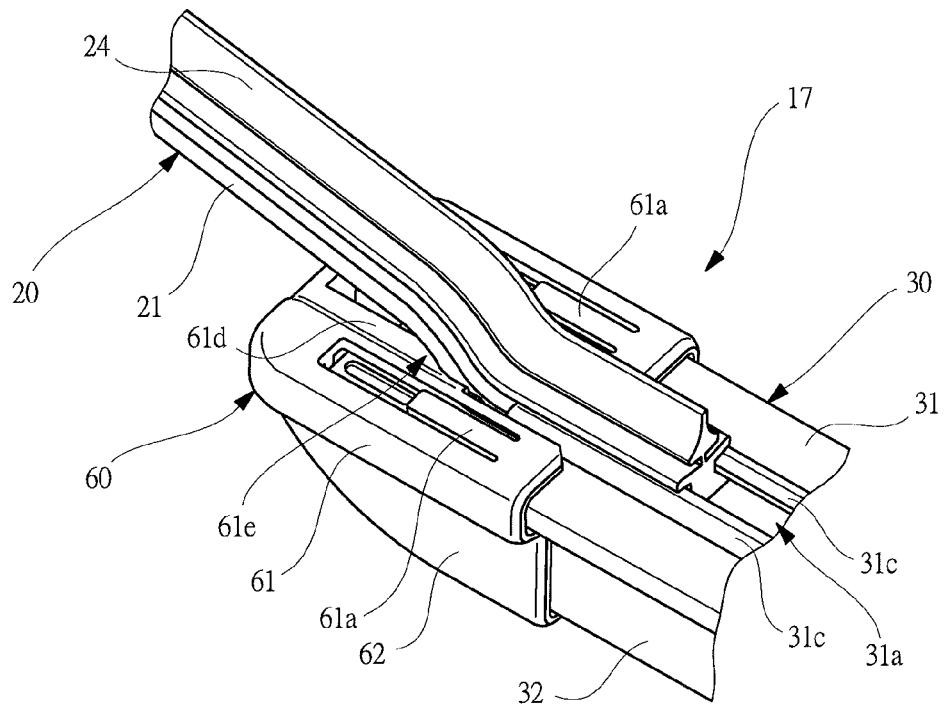
Figure 16A:
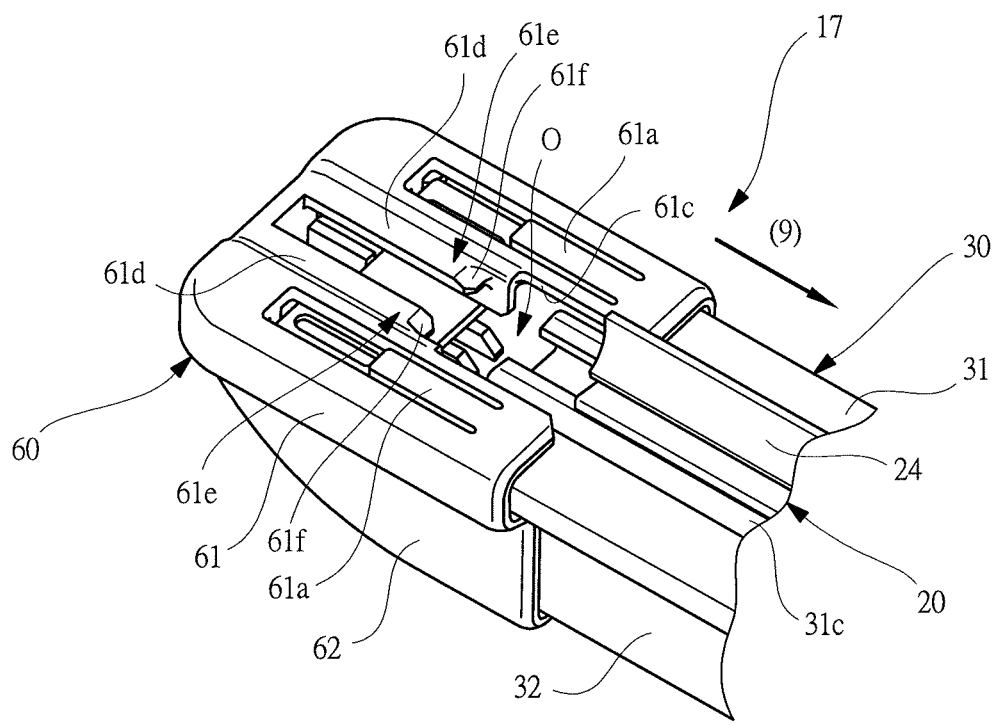
FIGS. 16A and 16B are perspective views explaining a procedure of attaching the blade rubber to the holder member (latter stage).
Figure 16B:
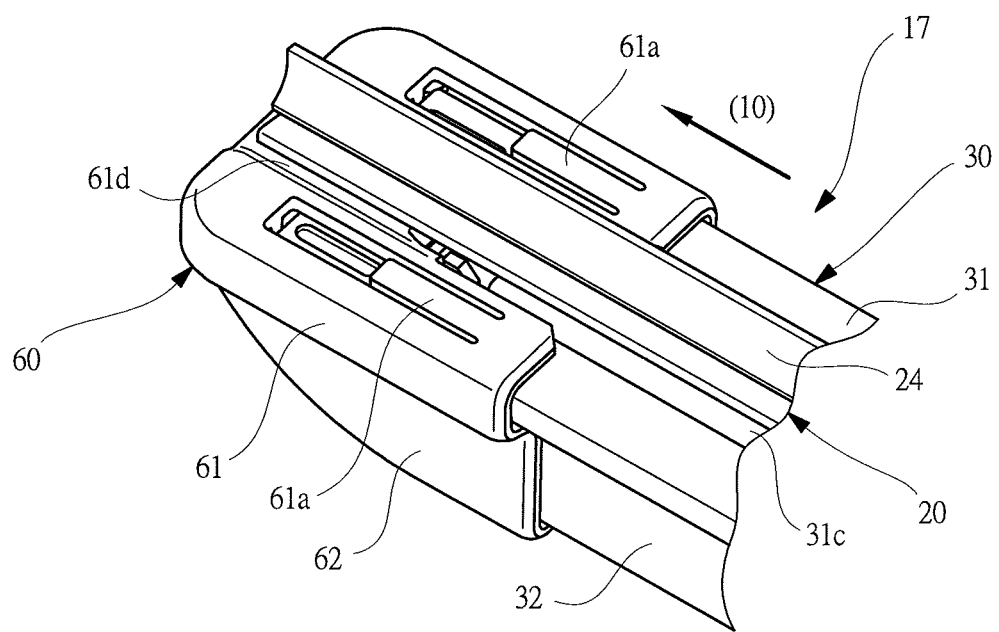

FIG. 11 is a cross sectional view taken along the line D-D of FIG. 2; FIG. 12 is an exploded perspective view showing a coupling structure (end part) of the vertebrae; FIGS. 13A and 13B are perspective views explaining a detailed structure of the end cap; FIGS. 14A and 14B are cross sectional views taken along the line E-E of FIG. 2 for explaining a procedure of attaching the end cap to the holder member; FIGS. 15A and 15B are perspective views explaining a procedure of attaching the blade rubber to the holder member (initial stage); and FIGS. 16A and 16B are perspective views explaining a procedure of attaching the blade rubber to the holder member (latter stage).

As shown in FIGS. 11 and 12, the pair of end caps 60 are attached to the longitudinal-direction both-end parts of the holder member 30, and each of the end caps 60 covers the coupling parts of each of the vertebrae 31e projecting from the longitudinal-direction both-end parts of the holder main body 31 forming the holder member 30 and prevent the blade rubber 20 from falling from the holder main body 31. Since both of the end caps 60 have the same shape, only one of the end caps 60 will be shown for explanation in the explanation hereinafter.

End parts of each of the vertebrae 31e are projected by a predetermined amount from the longitudinal-direction end parts of the holder main body 31, and long holes 35 extending along the longitudinal direction of each of the vertebrae 31e are provided in the projecting parts of each of the vertebrae 31e. Each of the vertebrae 31e is coupled by a coupling member 36, and the coupling member 36 is formed into a plate-like shape by punching processing (pressing processing) a steel plate.

A pair of positioning projected parts 36a is provided in the coupling member 36 corresponding to the long holes 35 of each of the vertebrae 31e, and each of the positioning projected parts 36a is inserted in each of the long holes 35. Thus, the distances of each of the projecting parts of the vertebrae 31e can be constant, and the projected parts of each of the vertebrae 31e can be coupled so that the distance is not changed. In the state in which each of the positioning projected parts 36a are positioned at each of the long holes 35, the longitudinal-direction both-sides of each of the coupling member 36 are bent by using an unshown swaging jig as shown by broken-line arrows in FIG. 12, and, as a result, the coupling member 36 is firmly fixed to the projecting parts of each of the vertebrae 31e.

The end cap 60 is formed into a predetermined shape by injection molding malted plastic or the like. The end cap 60 is provided with a cap main body 61 covering the coupling part (coupling member 36) of injection molding the vertebrae 31e, and a fin cover part 62 covering part of the fin part 32 forming the holder member 30.

As shown in FIG. 13, a pair of fall-off-preventing claw parts 61a is formed in the side of the cap main body 61 opposite to the fin cover part 62 side, and each of the fall-off-preventing claw parts 61a is disposed to be opposed to each other along the short-side direction of the end cap 60 (left-right direction in FIG. 11). The base-end side of each of each of the fall-off-preventing claw part 61a is integrally connected to the cap main body 61, and a projecting part 61b projecting toward the inside of the cap main body 61 is provided in the distal-end side of each of each of the fall-off-preventing claw parts 61a. As shown in FIG. 14, each of the fall-off-preventing claw parts 61a is elastically deformable; and, when the end cap 60 is to be attached to the end part of the holder member 30, the fall-off-preventing claw parts are elastically deformed by the coupling member 36.

To attach the end cap 60 to the end part of the holder member 30, as shown by an arrow (5) of FIG. 14A, the end cap 60 approaches along the longitudinal direction of the holder member 30. Then, when the end cap 60 is pushed forward to the holder member 30, the coupling member 36 fixed to each of the vertebrae 31e abuts each of the projecting parts 61b and pushes down each of the fall-off-preventing claw parts 61a as shown by an arrow (6). Then, when the end cap 60 is further pushed forward to the holder member 30, as show in FIG. 14B, the coupling member 36 moves over each of the projecting parts 61b, and each of the fall-off-preventing claw parts 61a return to the original state as shown by an arrow (7). As a result, each of the fall-off-preventing claw parts 61a is caught by the coupling member 36, and the end cap 60 is prevented from falling off from the holder member 30.

As shown in FIG. 13, a cut-away part 61c is provided in the side of the cap main body 61 opposite to the fin cover part 62 side, the cut-away part 61c is provided in an intermediate part along the short-side direction of the end cap 60. As shown in FIGS. 15 and 16, the cut-away part 61c forms an insertion opening O for inserting the main-body part 21 of the blade rubber 20 between the end cap 60 and the holder main body 31 in the state in which the end cap 60 is attached to the end part of the holder member 30.

In the side of the cap main body 61 opposite to the fin cover part 62, a pair of cap-side retaining claws 61d are provided, and each of the cap-side retaining claws 61d supports the front glass 11 side of the main-body part 21 as well as each of the retaining claws 31c provided on the holder main body 31. That is, as shown in FIGS. 15 and 16, each of the cap-side retaining claws 61d is disposed on the extension of each of the retaining claws 31c along the longitudinal direction of the holder main body 31.

Each of Guiding parts 61e guiding the main-body part 21 toward the retaining part 31a of the holder main body 31 provided in the holder main body 31 side along the longitudinal direction of each of the cap-side retaining claws 61d (right side in the drawing), that is, in the end cap 60 side forming the insertion opening O. Each of the guiding parts 61e is provided with an inclined surface 61f inclining from an outer part of the end cap 60 toward the retaining part 31a, thereby facilitating guiding of the main-body part 21 to the retaining part 31a.

Based on FIGS. 15 and 16, a procedure of attaching the blade rubber 20 to the holder main body 31 will be explained.

First, the blade rubber 20 corresponding to the length of the holder main body 31 and the holder member 30 attaching to the end caps 60 are prepared. As shown in FIG. 15A, the blade rubber 20 is inclined by a predetermined angle to the holder main body 31, and a first-end part of the blade rubber 20 (right side in the drawing) approaches the insertion opening O. The inclination angle of the blade rubber 20 to the holder main body 31 is the inclination angle of the inclined surfaces 61f provided at the guiding parts 61e. As shown by an arrow (8), when the first-end part of the blade rubber 20 approaches the insertion opening O, the main-body part 21 is guided by the inclined surfaces 61f, and the first-end part of the blade rubber 20 is inserted into the retaining part 31a. During inserting the blade rubber 20 into the retaining part 31a, as shown in FIG. 15B, the blade rubber 20 is gradually attached to the holder main body 31 with undergoing elastic deformation.

Then, as shown in FIG. 16A, the attaching operation of the blade rubber 20 to the holder main body 31 continues, and the blade rubber 20 is pressed toward the longitudinal direction thereof as shown by an arrow (9) to once compress the blade rubber 20. Then, the main-body part 21 is completely inserted in the retaining part 31a. Then, when the pressing force toward the blade rubber 20 is released, the blade rubber 20 is returned to a natural length as shown by an arrow (10) of FIG. 16B, and another end part of the blade rubber 20 (left side in the drawing) is moved toward the end cap 60. As a result, each of the cap-side retaining claws 61d on the extension of each of the retaining claws 31c support the front glass 11 side of the main-body part 21, and the operation of attaching the blade rubber 20 to the holder main body 31 is completed.

As described above in detail, according to the wiper blade 17 of the present embodiment, the pair of housing parts 31d are provided to sandwich the retaining part 31a retaining the main-body part 21; each of the vertebrae 31e are housed in each of the housing parts 31d, respectively; the arm coupling member 40 coupled to the wiper arm 15 is fixed to the vertebrae 31e; the rubber pressing part 31f pressing the main-body part 21 toward the front glass 11 is provided in the part of the retaining part 31a opposed to the front glass 11; and the holder pressing part 31g pressing the holder member 30 toward the front glass 11 by the elastic force of each vertebra 31e is provided in the part of each of the housing parts 31d opposed to the front glass 11 closer to the front glass 11 than the rubber pressing part 31f.

Therefore, the pressing force of the wiper arm 15 and the elastic force of the vertebrae 31e can be stably transmitted to the blade rubber 20 from the same height, and wiping performance can be improved. Since the holder pressing parts 31g are positioned closer to the front glass 11 than the rubber pressing part 31f, for example, even if the holder main body 31 is twisted, pressing force and elastic force can be stably transmitted from the holder pressing parts 31g to the rubber pressing part 31f, and the wiping performance can be further improved.

Moreover, according to the wiper blade 17 of the present embodiment, since each of the vertebrae 31e is housed in each of the housing parts 31d movably in the longitudinal directions thereof, the elastic force of each of the vertebrae 31e can be efficiently transmitted to the holder main body 31 and the blade rubber 20, and the wiping performance can be further improved.

Furthermore, according to the wiper blade 17 of the present embodiment, the fin part 32 is provided in the side of the holder main body 31 opposite to the front glass 11 side, and the vertex part 32a of the fin part 32 being the most distant from the front glass 11 is disposed in the downstream side of the flow direction of the travel winds along the short-side direction of the holder main body 31. Therefore, the blade rubber 20 can be disposed in the upstream side of the flow direction of the travel winds in the fin part 32. The wiping performance is improved by generating the downforce when the travel winds hit the fin part 32 can be efficiently applied to the blade rubber 20.

Moreover, according to the wiper blade 17 of the present embodiment, the travel-wind branching point P is formed in the upstream side of the flow direction of the travel winds along the short-side direction of the holder main body 31, the length h1 from the travel-wind branching point P to the vertex part 32a is longer than the length h2 from the travel-wind branching point P to the distal end of the lip part 24 of the blade rubber 20. Therefore, a large amount of travel winds can be hit the fin part 32 side of the holder main body 31, and the wiping performance can be further improved. Since sufficient downforce can be obtained while not largely increasing the size of the fin part 32, weight of the wiper blade 17 can reduce with improving the appearance of the wiper blade 17.

Furthermore, according to the wiper blade 17 of the present embodiment, the pair of housing parts 31d is provided to sandwich the retaining part 31a retaining the main-body part 21, the vertebrae 31e are housed in each of the housing parts 31d, respectively, the fin part 32 is provided to be along the longitudinal direction of the holder main body 31, the upstream-side lower-end surface part 31h positioned in the upstream side of the flow direction of travel winds and in the front glass 11 side is provided in the short-side-direction first side of the holder main body 31, the downstream-side lower-end surface part 31i positioned in the downstream side of the flow direction of the travel winds and in the front glass 11 side is provided in the short-side-direction second side of the holder main body 31, the upstream-side lower-end surface part 31h and the downstream-side lower-end surface part 31i are formed so that the cross section of the holder main body 31 along the short-side direction has an arc shape, and the curvature factor of the upstream-side lower-end surface part 31h is larger than the curvature factor of the downstream-side lower-end surface part 31i.

The height of the wiper blade 17 can be reduced by disposing the vertebrae 31e in both sides of the main-body part 21 forming the blade rubber 20, and excessive collision of travel winds can be suppressed. Therefore, large load onto the wiper motor 13 (worsening of drag) caused when the wiper blade 17 moves over the wiping range 18a or 18c can be suppressed. Moreover, since the curvature factor of the upstream-side lower-end surface part 31h is larger than the curvature factor of the downstream-side lower-end surface part 31i, the travel winds can be smoothly guided from the upstream-side lower-end surface part 31h to the surfaces of the holder main body 31 and the fin part 32 so that the winds move along the surfaces of the holder main body 31 and the fin part 32. Accordingly, detachment of the travel winds from the holder main body 31 and the fin part 32 can be suppressed, generation of negative pressures caused by the detachment can be suppressed, and lifting force acting on the wiper blade 17 can be stabilized (wiping performance can be improved).

Furthermore, according to the wiper blade 17 of the present embodiment, the upstream-side air-current surface part 32b and the downstream-side air-current surface part 32d are provided respectively in the short-side-direction first side and the short-side-direction second side of the fin part 32, the air-current surface parts 32b and 32d are formed so that the cross section along the short-side direction of the fin part 32 has an arch shape, and since the curvature factor of the upstream-side air-current surface part 32b is smaller than the curvature factor of the downstream-side air-current surface part 32d, a sufficient amount of travel winds can be hit the upstream-side air-current surface part 32b, and sufficient downforce can be applied to the wiper blade 17.

Additionally, according to the wiper blade 17 of the present embodiment, the connecting surface part 32c of which cross section along the short-side direction of the fin part 32 has an arc shape is provided between the upstream-side lower-end surface part 31h and the upstream-side air-current surface part 32b. Therefore, the upstream-side lower-end surface part 31h and the upstream-side air-current surface part 32b can be smoothly connected, and worsening of drag and lifting force acting on the wiper blade 17 can be further suppressed.

Moreover, according to the wiper blade 17 of the present embodiment, since the holder main body 31 and the fin part 32 is two-color molded by materials having mutually different hardness, the manufacturing step of the wiper blade can be simplified. In the present embodiment, the holder main body 31 has sufficient strength, the fin part 32 can be easily deformed by travel winds, and the drag and lifting force acting on the wiper blade 17 in accordance with the strength of the travel winds are optimized.

The present invention is not limited to the above described embodiment, but including various modifications within the scope of the present invention not departing from the gist thereof. For example, in the above described embodiment the wiper blade 17 is applied to the wiper device 12 wiping the front glass 11 serving as a windshield. However, the present invention is not limited thereto, but can be applied to a wiper device wiping a rear glass serving as a windshield.

The wiper blade is used for carrying out reciprocating wiping operation on a windshield by rotary drive of a wiper motor provided in a vehicle such as an automobile and for improving view of, for example, a driver.

While the present invention has been illustrated and described with respect to a particular embodiment thereof, it should be appreciated by those of ordinary skill in the art that various modifications to this invention may be made without departing from the spirit and scope of the present.

What is claimed is:

1. A wiper blade attached to a wiper arm swingably provided on a vehicle and operating reciprocating wiping on a windshield, comprising:
    a blade rubber comprising
        a lip part contacted with the windshield and
        a main-body part integrally formed with the lip part;
    a holder main body comprising a retaining part retaining the main-body part;
    a pair of housing parts provided in short-side-direction on both sides of the holder main body so as to sandwich the retaining part;
    a pair of vertebrae housed in each of the housing parts and elastically deforming the blade rubber in accordance with a curvature factor of the windshield;
    an arm coupling member fixed to each of the vertebrae and coupled to the wiper arm;
    a rubber pressing part provided in an opposed part to the windshield of the retaining part, and pressing the main-body part against the windshield; and
    a holder pressing part that is provided in an opposed part to the windshield of each of the housing parts, and in a side closer to the windshield than the rubber pressing part and pressing the holder main body toward the windshield by elastic force of the vertebra.

2. The wiper blade according to claim 1, wherein each of the vertebrae is movably housed in the housing parts in the longitudinal direction thereof.

3. The wiper blade according to claim 1, wherein a fin part is provided in an opposite side to the windshield side of the holder main body; and a vertex part farthest from the windshield of the fin part is disposed in a downstream side of a flow direction of a travel wind along a short-side direction of the holder main body.

4. The wiper blade according to claim 3, wherein a travel-wind branching point is formed in an upstream side of the flow direction of the travel wind along the short-side direction of the holder main body; and a length from the travel-wind branching point to the vertex part is longer than a length from the travel-wind branching point to a distal end of the lip part of the blade rubber.

5. The wiper blade according to claim 1, further comprising an upstream-side lower-end surface part provided in a short-side-direction on first side of the holder main body and positioned in an upstream side of a flow direction of a travel wind and in a side of the windshield; and
    a downstream-side lower-end surface part provided in a short-side-direction on second side of the holder main body and positioned in a downstream side of the flow direction of the travel wind and in the side of the windshield;
wherein the upstream-side lower-end surface part and the downstream-side lower-end surface part are formed so that a cross section of the holder main body along the short-side direction has an arc shape, and a curvature factor of the upstream-side lower-end surface part is larger than a curvature factor of the downstream-side lower-end surface part.

6. The wiper blade according to claim 5, wherein the holder main body is integrally provided with a fin part so as to be along a longitudinal direction of the holder main body.

7. The wiper blade according to claim 6, wherein an upstream-side air-current surface part and a downstream-side air-current surface part are provided in a short-side-direction on first side and a short-side-direction on second side of the fin part, respectively; each of the air-current surface parts is formed so that a cross section thereof along the short-side direction of the fin part has an arc shape; and a curvature factor of the upstream-side air-current surface part is smaller than a curvature factor of the downstream-side air-current surface part.

8. The wiper blade according to claim 7, wherein a connecting surface part of which cross section along the short-side direction of the fin part has an arc shape is provided between the upstream-side lower-end surface part and the upstream-side air-current surface part.

9. The wiper blade according to claim 6, wherein the holder main body and the fin part are two-color molded with materials of which hardness is different.

* * * * *